United States Patent
Woolf et al.

(10) Patent No.: US 10,375,978 B2
(45) Date of Patent: Aug. 13, 2019

(54) CONTROLLED BLAST CELL COOLING

(71) Applicant: Lineage Logistics, LLC, Irvine, CA (US)

(72) Inventors: Alexander James Woolf, San Francisco, CA (US); Alexander Zhang, Irvine, CA (US); Gabriel West, Irvine, CA (US); Elliott Gerard Wolf, San Francisco, CA (US); Tony Caetano, Irvine, CA (US); Christopher Eckman, San Francisco, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 15/673,180

(22) Filed: Aug. 9, 2017

(65) Prior Publication Data
US 2019/0045817 A1    Feb. 14, 2019

(51) Int. Cl.
*A23L 3/36* (2006.01)
*F25D 17/04* (2006.01)
*F25D 17/08* (2006.01)
*F25D 13/02* (2006.01)
*A23B 4/06* (2006.01)
(Continued)

(52) U.S. Cl.
CPC .............. *A23L 3/364* (2013.01); *A23B 4/068* (2013.01); *A23B 7/0433* (2013.01); *A23L 3/001* (2013.01); *F25D 13/02* (2013.01); *F25D 13/04* (2013.01); *F25D 17/045* (2013.01); *F25D 17/06* (2013.01); *F25D 17/08* (2013.01); *F25D 29/00* (2013.01);
(Continued)

(58) Field of Classification Search
CPC ......... A23L 3/364; A23L 3/001; A23B 4/068; A23B 7/0433; F25D 13/02; F25D 17/06; F25D 17/005
See application file for complete search history.

(56) References Cited

U.S. PATENT DOCUMENTS 2,196,310 A    4/1940  Kalin
2,318,532 A    5/1943  Scott
(Continued)

FOREIGN PATENT DOCUMENTS

WO    WO 2014/129143    8/2014

OTHER PUBLICATIONS

Greenquist, "Blast Freezing: How Does it Work, and How Do I Get the Most Production Out of My Equipment?" Pacific Fisheries Bering Sea and Distant Water Fleets Review, Dec. 2012, 6 pages.
(Continued)

*Primary Examiner* — Frantz F Jules
*Assistant Examiner* — Martha Tadesse
(74) *Attorney, Agent, or Firm* — Fish & Richardson P.C.

(57) ABSTRACT

A blast cell system is disclosed that includes a plurality of bays that are spaced across the blast cell, arranged to hold items to be cooled, wherein each bay is separated from each other bay so as to prevent cross-flow of air from one bay to another bay; a plurality of louvers, each covering a different bay of the plurality of bays; one or more flow sensors, temperature sensors, or both positioned to sense conditions for each of the plurality of bays; and a controller programmed to modulate open-closed positions of each of the plurality of louvers separately from others of the plurality of louvers, so as to allow different volumes of cooling air to flow through each respective bay.

20 Claims, 10 Drawing Sheets

(51) Int. Cl.
  *A23B 7/04* (2006.01)
  *A23L 3/00* (2006.01)
  *F25D 29/00* (2006.01)
  *F25D 13/04* (2006.01)
  *F25D 17/06* (2006.01)

(52) U.S. Cl.
  CPC .. *A23V 2002/00* (2013.01); *F25D 2317/0671* (2013.01); *F25D 2700/122* (2013.01)

(56) References Cited

U.S. PATENT DOCUMENTS

| | | | | |
|---|---|---|---|---|
| 3,160,993 A * | 12/1964 | McCormick, Jr. | ...... | B24C 3/263 451/3 |
| 4,669,278 A | 6/1987 | Lee, Jr. et al. | | |
| 5,452,588 A | 9/1995 | Onodera | | |
| 5,520,006 A | 5/1996 | Middleton | | |
| 6,422,031 B1 * | 7/2002 | Mandel | ................. | F25D 17/062 62/408 |
| 6,796,142 B2 * | 9/2004 | Burn | ..................... | F25D 13/067 62/380 |
| 8,783,047 B2 * | 7/2014 | Tippmann | ............... | F25D 13/00 62/99 |
| 2004/0109288 A1 | 6/2004 | Beitelmal et al. | | |
| 2010/0119672 A1 * | 5/2010 | Crane | ..................... | A23B 7/04 426/419 |
| 2017/0086485 A1 * | 3/2017 | Tippmann | ............... | A23L 3/364 |

OTHER PUBLICATIONS

Bransteter, "A Better Way to Blast Freeze," Global Cold Chain Alliance, Tippmann Group, retrieved on Jan. 16, 2018. Retrieved from the Internet: URL<https://www.gccaonline.com/eweb/documents/A-Better-Way-To-Blast-Freeze.pdf.>. 26 pages.

International Search Report & Written Opinion in International Application No. PCT/US2018/046076, dated Nov. 23, 2018, 32 pages.

* cited by examiner

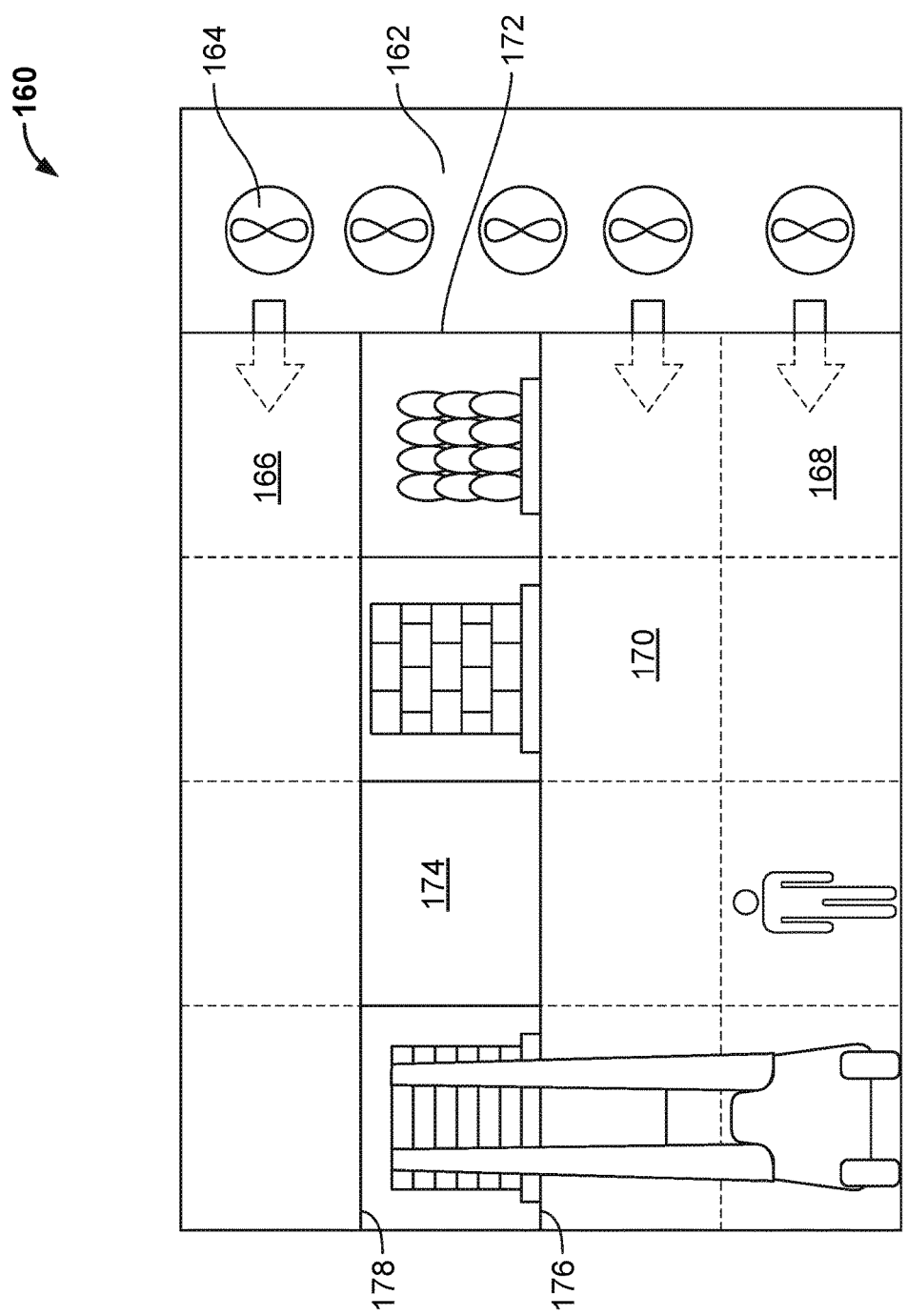

CONTROLLED BLAST CELL COOLING

TECHNICAL FIELD

This specification relates to technology for efficiently cooling physical items in a blast cell.

BACKGROUND

Convective air blast freezing is a process by which freezing of items like foodstuffs is facilitated by flowing very cold air over the items via mechanical force, typically in very large volumes of goods (e.g., many pallets) and airflow (e.g., thousands of cubic feet per minute (CFM)). Blast freezing is typically used on perishable foods (e.g., fruits and meats) geographically near their point of initial food processing. Such goods may then be stored for a short or long period in frozen warehouse, and then shipped to a point close to their use (e.g., to a grocery store or a warehouse operated by a particular grocer).

Such food decays largely because it includes water, which when not frozen, is a hospitable environment for bacteria and other pathogens. Blast freezing can prevent this process and thus is employed broadly in the food distribution industry. Blast freezing can be a large and expensive consumer of electricity, natural gas, or other mechanisms needed to operate chillers, fans, and other equipment required to perform such large-scale cooling.

SUMMARY

This document generally describes technology for blast freezing of items such as perishable foodstuffs. In the systems and processes discussed here, temperature, airflow levels, or both, are monitored at one or more points across the cross-sectional area of a blast cell as part of a closed-loop control system. The control may be performed at a relatively granular level for each column or row in the blast cell, such as at each bay (intersection of a column and row in the cell cross-section, similar to a pixel in electronic display technology). For example, the exit and/or entry temperature for each bay in the cell may be monitored, and a louver or louvers that serve that particular bay (and which may be at the upstream or downstream end of the bay) may be adjusted automatically to achieve a particular goal, such as to increase cooling air flow through a particular bay so as to speed the cooling of items that have been placed in that bay as compared to the cooling of items placed in other bays. At the same time, louvers that serve other bays (e.g., by being located on the downstream ends of the bays so as to be able to partially or fully block air flow through that bay) may be adjusted individually and separately from each other based on temperature and/or pressure readings for each corresponding bay in the grid across the cross-section of the cell.

In particular implementations, such monitoring can allow the blast cell to operate so as to match the current needs of an operator of the blast cell—where those needs may be specific to a particular sub-section of the cell, such as on a per-row, per-column, or per-bay level. For example, where quick freezing is desired, full airflow may be provided across the entire cross-section of the cell for an entire cooling period, and each bay can be monitored to identify when the last of the bays hits a desired freezing temperature (a "high throughput mode" for the system). Such an approach may be less energy-efficient and may over-cool certain items in the cell, but it should do the best job of ensuring that the slowest-cooling bay of the cell cools as fast as possible, and thus permit for quick turn-around (because the slowest cooling bay or pallet drives the end time of a zone that has to be stopped and opened for loading and unloading).

In another example, the level of airflow may be changed over time in an overall blast cell and separately in particular sub-portions of a blast cell, such as by monitoring flow with one or more sensors placed across the cross-sectional area of the cell (e.g., a separate set for each row, column, or bay), and flowing comparatively less air as the cell (or each sub-area of the cell) cools down. For example, a "low cost mode" may lower the volume of air supplied by fans in a cell as particular bays hit a desired temperature and their respective louvers are closed (and where the closing for each bay may be separate to that of other bays, and may be gradual so the some bays are throttled down in terms of air volume faster than others), so that the cell effectively becomes smaller over time, and less air volume is needed to maintain a particular air velocity in each relevant part of the cell. In a related approach, the louvers in each bay may be progressively throttled down as that bay approaches a desired freezing temperature, so that more air is then circulated through the bays that are cooling more slowly, and so that all of the bays can converge on the desired temperature together, and reach that temperature close in time to each other—which may both lower costs and lessen overall cooling time of the cell, as compared to operating each back at a constant level throughout a cooling cycle.

And in each example, the volume of air that is allowed to flow through any particular cross-sectional bay of the cell may be controlled vis-à-vis the amount that is allowed to flow in other areas of the cell. For example, a part-load may be made of the cell so that some cross-sectional areas are empty of goods or only partially blocked by goods, and the system may be controlled to close the empty bays, and to throttle the not-full bays so that they flow effectively the same amount of air as do bays that are more full with goods. In such situations, the cell may be split cross-sectionally into an m×n grid of bays (where m and n are each integers), and each part of the grid may have one or more louvers that are modulated together in response to temperature, pressure, or other sensors (and combinations of sensors and sensor types) to adjust the flow of each cross-sectional bay accordingly. The louvers may all be located, for example, in a continuous wall on the upstream or downstream end of the bays, so that air can pass through the wall only by going through an open louver (though some residual leakage may be permitted). Each part of the grid may be fully isolated from other portions (into distinct tunnels that run from an upstream to a downstream end of the cell) so as to isolate cross-flow between the sections in the cell, or each part of the grid may be open at its sides to other sections so as to permit some cross-flow while still allowing sufficient per-bay flow control so as to achieve better and more efficient cooling of all the items placed in the blast cell. In some implementations, vertical walls may be installed to prevent lateral flow between adjacent bays, but horizontal floors may be eliminated so as to make loading and unloading with a forklift or similar device easier (i.e., by allowing forklifts to drive down each respective tunnel), which may result in some vertical airflow between bays that are above or below each other. In yet other implementations, the cell itself may be open vertically, but pallets placed at different heights within the cell may block the vertical cross-flow of air between vertically adjacent bays.

In one implementation, a blast cell system is disclosed and comprises a plurality of bays that are spaced across the blast cell, arranged to hold items to be cooled, wherein each bay is separated from each other bay so as to prevent cross-flow of air from one bay to another bay; a plurality of louvers, each covering a different bay of the plurality of bays; one or more flow sensors, temperature sensors, or both positioned to sense conditions for each of the plurality of bays; and a controller programmed to modulate open-closed positions of each of the plurality of louvers separately from others of the plurality of louvers, so as to allow different volumes of cooling air to flow through each respective bay. The plurality of fans may be in fluid communication with a single plenum that serves all of the plurality of bays. Also, the cross-sectional area may be divided into an m×n grid, where m is a positive integer greater than one and n is a positive integer greater than one. Moreover, each bay can include (a) one or more flow sensors to identify a volume of airflow through a respective bay and (b) one or more temperature sensors to identify a temperature of airflow through the respective bay, and the controller can be programmed to control respective ones of the plurality of louvers so as to provide comparatively greater airflow, as determined via the air flow sensors, to bays that are indicated as having comparatively higher temperatures than other bays.

In certain aspects, the controller is programmed to provide air flow so as to minimize a time between which a first bay of items in the blast cell have been fully frozen and a last bay of items in the blast cell have been fully frozen for a given overall level of airflow through the blast cell. In addition, each bay can be open from an entering end where fans supply air to each bay to an exit end where air is returned to the fans, and the louvers can be located at the exit end of each bay. In some aspects, each bay can be separated from each other bay by vertical panels that extend the substantial length of each bay, and alternatively, or in addition, each bay can be separated from each other bay by horizontal panels that extend the substantial length of each bay. The system can also comprise a movable air blockade arranged to selectively block blast cell air flow from a selected plurality of blast cell bays while: (a) permitting access to the selected plurality of blast cell bays from outside the blast cell and (b) permitting air flow to blast cell bays other then the selected plurality of blast cell bays.

In another implementation, a method of operating a blast cell system is disclosed. The method comprises circulating cooling air with one or more cooling fans through a plurality of blast cell bays that are each laterally separated from adjacent blast cell bays so that cross-flow of air between bays is prevented; measuring temperature, air flow levels, or both in each of the plurality of blast cell bays; determining from the measured levels particular levels of air flow for each of the plurality of blast cell bays so as to achieve a desired cooling level; and controlling louvers associated with respective ones of the bays to create the determined levels of air flow through each of the blast cell bays, wherein louvers for a first of the blast cell bays are controlled separately from louvers for others of the blast cell bays. In addition, a plurality of fans can be in fluid communication with a single plenum that serves all of the plurality of bays. Moreover, a cross-sectional area of the blast cell is divided into an m×n grid, where m is a positive integer greater than one and n is a positive integer greater than one, and each bay in the grid has a louver that is adjusted separately from each other bay in the grid. Moreover, each bay can include (a) one or more flow sensors that identify a volume of airflow through a respective bay and (b) one or more temperature sensors that identify a temperature of airflow through the respective bay, and the method can further comprise employing a computer controller to control respective ones of the plurality of louvers so as to provide comparatively greater airflow, as determined via the air flow sensors, to bays that are indicated as having comparatively higher temperatures than other sub-areas.

In certain aspects, the controller provides air flow so as to minimize a time between which a first bay of items in the blast cell have been fully frozen and a last bay of items in the blast cell have been fully frozen for a given overall level of airflow through the blast cell. Also, each bay may be open from an entering end where fans supply air to each bay to an exit end where air is returned to the fans, and wherein the louvers are located at the exit end of each bay. The method may additionally comprise moving an air blockade arranged to selectively block blast cell air flow from a selected plurality of blast cell bays so as to: (a) permit access to the selected plurality of blast cell bays from outside the blast cell, and (b) permit air flow to blast cell bays other than the selected plurality of blast cell bays.

In yet another implementation, a method of providing a per-bay controllable blast cell is disclosed, and comprises providing one or more fans controlled by a variable frequency drive to serve a blast cell; providing full-length baffles between bays in the blast cell that extend from a front end of the blast cell to a back end of the blast cell, to block cross-flow of air between the bays; and providing separately-controllable louvers at the front end of each bay of a plurality of bays in the blast cell and connecting the louvers to a control system that is arranged to control louvers for a particular bay separately from louvers for other bays, based on sensed temperature readings, air flow readings, or both, taken from respective ones of the bays.

Particular implementations may realize one or more of the following advantages. For example, a blast cell may provide cooling at lower cost, higher speed, or with greater uniformity of temperature (and less unnecessary super-cooling), including a combination of two or all such factors—as compared to a blast cell that does not have split bays that are not separately controlled for flow rate. An operator of such a system may also use their ability to control particular louvers separate from other louvers so as to directly address other issues with blast cell cooling. For example, if the operator knows that a particular bay is filled with one type of item (e.g., strawberries) while another bay is filled with another type of item that may be different in size or heat characteristics (e.g., chicken breasts), the operator may establish operation parameters to ensure fast and efficient cooling all of the items (by individual throttling of louvers for each sub-portions), typically with a goal of having them all hit the desired temperature close in time to each other. Such control may be achieved by the operator entering data to identify the type and amount of item at each bay, and the system determining a relative air velocity for that item that is needed, and then controlling louvers for the corresponding bay to achieve that air flow level. Other flexibility and efficiency can also be obtained by transparency of inputs and the fine-tuned control over outputs (e.g., per bay, per louver, or by another measure), along with the closed-loop control provided within such a system for an operator.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1E is a front elevation view of a second per-bay controllable and isolatable blast cell.

Like reference numbers and designations in the various drawings indicate like elements.

DETAILED DESCRIPTION

Figure 1A:
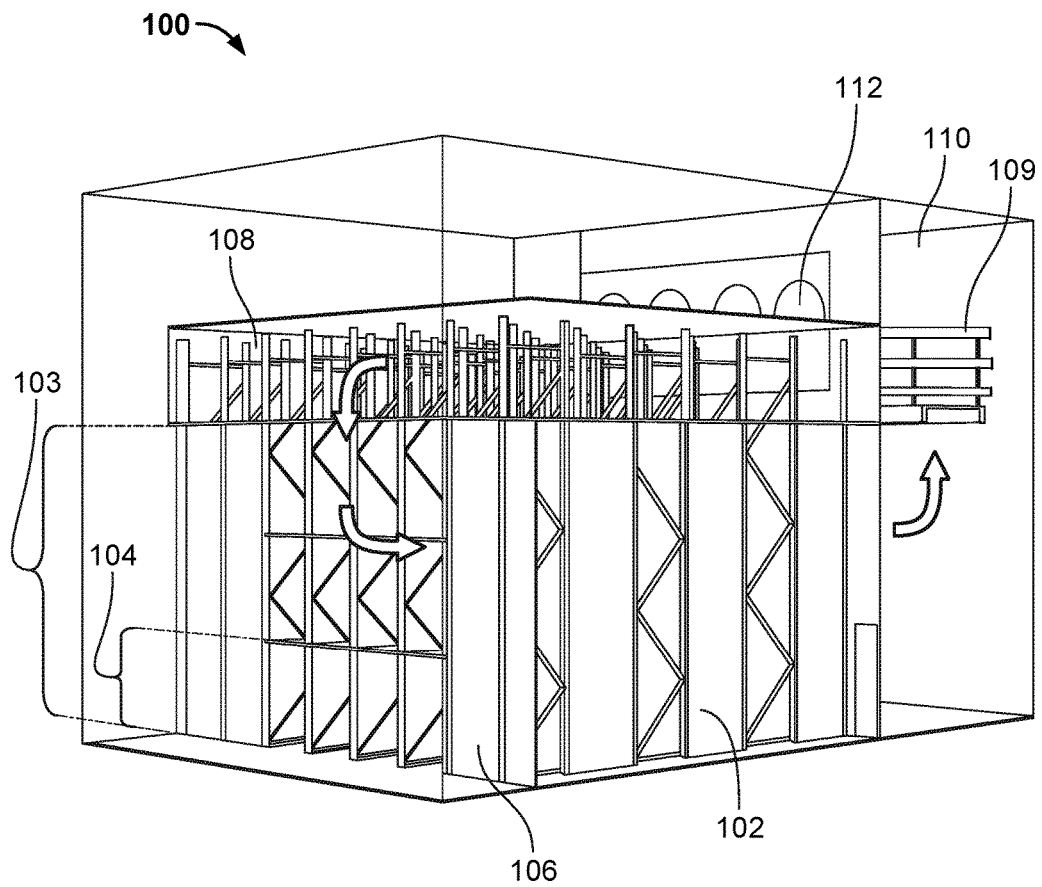
FIG. 1A is an oblique view from the front-and-side of a per-bay controllable blast cell.

Described below are various implementations of methods and systems for blast freezing items such as perishable foodstuffs that have previously been packed as groups of items onto shipping and storage pallets. The systems and techniques discussed here permit per-row, per-column, and/or per-bay control (including on-off control and modulated control) of air flow—where each bay represents a sub-portion of the available cross-sectional area of the blast cell. For example, the bays of a blast cell may be vertical or horizontal slices across the cross-section of the cell (i.e., columns or rows). At a more discrete level, each bay may be an intersection of a particular column and a particular row, so that the cell is divided into an m×n grid (where m and n are positive integers, and general would be greater than 2), and particular ones of the bays are controlled separately from particular other ones.

One end of the cell, e.g., the upstream side of the cell, as air is circulated, may be generally open or openable for loading of items into the cell, such as by driving a forklift up to the front face of the cell, and perhaps driving it into the cell to deposit pallets of articles. The other face of the cell (typically the downstream, or back, face) may be covered in a plurality of controllable louvers, where each bay may have one or more louvers, and those louvers for each bay may be controlled by a single control signal and thus moved in unison, while louvers for other bays may be controlled with different control signals (though certain blocks of bays, but less than all bays, may receive the same control signal). Air circulation and cooling may be provided by a bank of, respectively, fans and cooling coils at a side of the various bays in the blast cell. For example a line or grid of fans and a line or grid of cooling coils may be arranged to a side (e.g., top or bottom side, or left or right side) of the main part of the blast cell, so that air coming out of that main part may be routed around one or more sides of the main part of the blast cell and be boosted in speed/pressure and in cooling potential as it is so routed. The fans and/or coils may also be located positionally in front of or behind (partially or wholly) the main part of the blast cell, such as by positioning the coils against the downstream faces of the control louvers. The fans may be upstream of or downstream of the coils (though fans placed upstream might release their motor heat into warmer air that will then be cooled, and thus should allow for more efficient and more complete cooling of the air before it re-enters the main portion of the cell).

The louvers or other flow control mechanisms may be cooperatively and computer controlled so as to achieve a cooling profile desired by an operator of the system. In general, that may involve throttling (partially or fully) air flow volumes through each respective sub-area of the cell (e.g., on a per-bay basis). As one example, it may involve throttling down louvers that serve emptier bays relative to those that serve fuller bays so as to maintain equal pressure drops and equal air flow speeds for each bay, so that each bay gets an equal amount of cooling power.

In another example, the louvers may be throttled in different manners so that some sub-portions of the cell receive more cooling power (per unit of time) compared to others. For example, temperature sensors may be used to cause higher-temperature sub-portions of the cell to receive more airflow than other sub-portions. As another example, values of the specific temperature for items in different sub-portions may be used to determine an amount of flow through each sub-portion—e.g., a first sub-portion that is at a same temperature as a second sub-portion may be provided greater or lesser airflow based on a determination of the specific heat value for its items, or based on the identified mass or volume of the items, so as to better equalize the rate of change in temperature between the two sub-portions (e.g., if the goal is to have all portions of the cell reach a target cooled temperature closed to each other in time). An electronic model may also be employed and consulted that takes into account parameters like specific heat of particular items (e.g., as represented by values of cooling rate for particular types of items), starting temperatures, pressure drops along the lengths of particular bays, and other factors, to determine a level to which louvers for each bay in a system will be controlled over time during a cooling cycle—so as to set a plan before a cycle starts. And in some instances, such parameters may be compared to actual cooling performance after the cycle starts and is running (e.g., if one bay cooled to its target temperature before another, when the goal was to have them hit an end temperature together), and differences may be used to train a learning model, so that when the parameters are entered for a future cooling cycle, the system may use trained data to determine appropriate control parameters to use for each bay in the blast cell.

Referring now to FIG. 1 more particularly, there is shown an oblique view from the rear-and-side of a per-bay controllable blast cell 100. In general, the rear face of the cell 100 is shown to the left, a side wall of the cell 100 is shown in the middle (where the side walls will generally be solid and sealed, though some segments of the walls are shown here with support structure on the exterior surface), and components at the end of the cell 100 can be seen to the right and in the rear.

The cell 100 in this example, may be tens of feet wide and high, such as 20-100 feet wide and 10-50 feet high, for example. The blast cell 100 may be located inside a storage building, such as in a typical warehouse, and may rest on a concrete or similar floor. A face of the cell 100 may be open and may be sectioned into multiple distinct bays that may run then into the cell 100 toward the back wall of the cell 100. The face of the cell 100 may be seen more clearly in FIG. 1B. A bay 104 is typical of twelve distinct bays in this example—where the cell 100 is four bays wide by three high, for a 4×3 grid. Each such bay extends from the face of the cell 100 to a rear of the cell (to be shown and described in later figures).

Figure 1B:
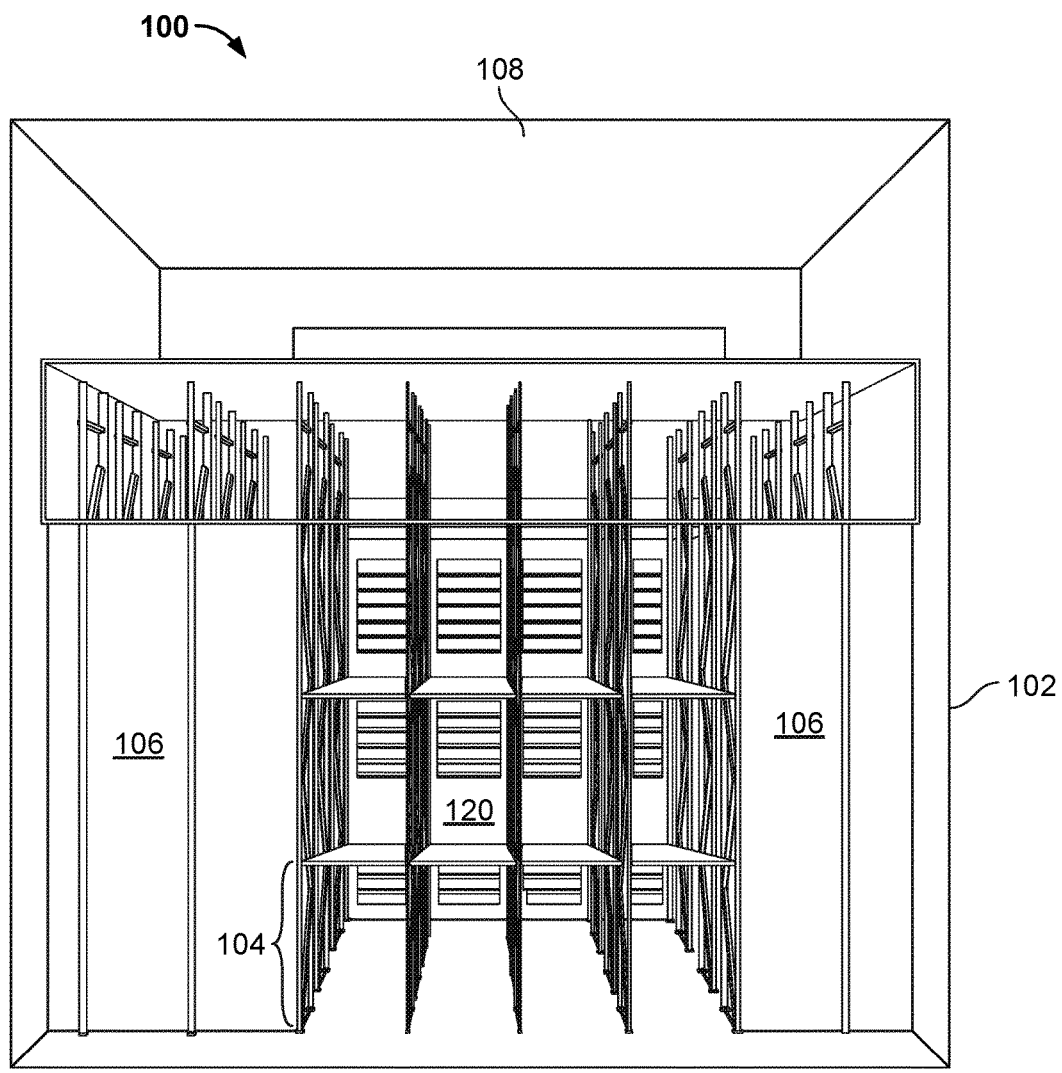
FIG. 1B is the blast cell of FIG. 1A viewed from it face.

In FIG. 1B, louvers 120 may be seen at the far end of the blast cell 100, at the downstream, or back, end of the blast cell 100. As described in more detail below, each bay of the cell 100 may have its own individually-controlled louver or louvers 120 that are arranged to control air flow volumes through that particular bay. Each other bay may likewise have a respectively-controlled louver or louvers 120. As also described in more detail below, each bay may also include one or more temperature sensors and one or more pressure, air volume, and/or velocity sensors to determine a volume of airflow through the respective bay and also temperatures of air along the bay, such as entering and exiting temperatures for each respective bay. The sensors may serve as inputs (amount other inputs such as parameters that reflect heat transfer properties of the goods in each bay) for one or more algorithms used to control positioning of the respective louvers so as to achieve cooling cycle goals for an operator of the cell 100.

As shown in the figures, each bay 104 is fully separated (top, bottom, and sides) from each adjacent bay. In various implementations, the separators (along with exterior walls of the blast cell 100) may be sheet materials of various forms, such as plastic or sheet metal, that are sufficiently strong to handle pressures involved in the blast cell and to not break down under conditions of cold temperatures and potentially high humidity. The dividers between bays and the walls around the cell 100 may also be sealed in appropriate manners to prevent meaningful air escaping particular bays into adjacent bays and air escaping the cell 100, such as by lap joining of adjacent sheets of materials, using foam or silicon sealants, and other appropriate mechanisms. The sealing of the outer housing of the cell 100 may need to be more complete than the sealing between adjacent bays because of the greater expected temperature and pressure differentials between the inside of the cell 100 and its outside, as compared to the temperature and pressure differences between adjacent bays.

Certain of the dividers between bays may be removable. For example, the horizontal dividers that separate one vertical level from another may be partially or fully removable so that forklifts may more readily enter the cell 100 to place and remove pallets of materials. For example, the floors in each bay above the first level may be split into multiple pieces, each piece being one or two pallets long, that may be tilted up and out of the way against the respective sidewall of the column in the cell 100 when access to the column is needed. Therefore, when a cell is empty, all but the floor pieces at the rear of the cell may be tipped up and out of the way. A forklift may then add pallets to those last sections at each vertical level. The sections adjacent to the backmost sections may then be flipped down into horizontal position, and pallets may be loaded onto those sections. The process may repeat itself, with the loading move back toward the face of the cell 100 until the respective column is filled up. Removal of items from the column may occur in the reverse order, with pallets removed from the section closest to the face first, and then the floors for that section tilted out of the way or removed, and the forklift being able to then drive deeper into the cell 100 to remove the next-deeper section of pallets.

In other instances, there may be no floors so that forklifts can readily move forward and back in the columns. In such situations, the pallets may be stacked on top of each other. Or flanges may extend outward slightly at each vertical level from the respective sidewalls (e.g., 6 inches or a foot on each side) and the space between the flanges may be wider than the forklift's lift section but narrower than the pallets, so that the pallets can rest on the flanges when the forklift lowers them onto the flanges and drives away. In certain instances, the pallets may be formed to seal against the flanges and against each other so as to effectively form a mostly airtight floor between each vertical level that air will not flow appreciably between, so that air isolation may be maintained between different levels of a particular column even though no walls of the cell 100 provide the isolation.

As further shown in FIG. 1A, the rear of the cell 100 (partially obscured here) includes a fan bank 110 that includes one or more fans 112. In this example, the fan bank 110 is located at the rear-top of the cell 100, and includes a plurality of fans like fan 112 arrayed horizontally adjacent to each other across the top rear corner of the cell 100. In other implementations, the bank 110 may be located in other positions, such as at the bottom of the cell 100 or at one or both sides of the cell, in which instance, the fans would likely be arrayed vertically adjacent to each other. There may also be multiple banks of fans—e.g., one to the right of the cell 100 and one to the left. The fans may take a variety of appropriate forms, including propeller fans, axial fans, and centrifugal fans. Each fan may be sized to provide the required volume of air across expected pressure drops for the overall circulation through the cell 100 when it is loaded partially and fully.

As described further below, the fans may be placed in parallel with each other and controlled in coordination to provide needed air circulation. For example, particular ones of the fans may be turned off when less air circulation is needed (e.g., when the louvers for multiple bays have been closed). Also, variable-frequency drives may be provided to operate the fans, so that the fan speeds may be varied as the need for different volumes of air circulation changes—e.g., the speed may fall as demands fall, until one of the fans is shut off and the speeds of the remaining fans are adjusted so as to return to a desired airflow level for the cell 100.

Cooling coils (not shown) may be placed in the cell 100 or adjacent to it. For example, the cooling coils may be placed at the face of the back side of the cell 100 and receive exit air directly through the louvers (as may the fans). The cooling coils may alternatively be placed against the upstream or downstream faces of the fans, or may be placed in the plenum 108 or another plenum or area where the air circulates so as to receive warmed air and provide cooled air. In other instances, the cooling coils may be placed out of the main air circulation for the cell 100, such as on the roof of a building, and a single bank of cooling coils may server multiple cells. In such an instance, a pair of taps may be made into plenum 108 or another part of the air circulation of cell 100, where one tap may draw air out of the cell 100, and the other may return the cooled air into the cell, so that it can blend in with the main airflow of the cell 100. In such an example, the volume of the cooled air may be substantially less than the volume of the air circulating through the cell, so that the change in temperature of the air from passing through the coils should be greater than it would be if all circulating air passed through the coils. Such an implementation may be beneficial when the temperature change is not high, so that savings in pressure drop by taking the coils out of the high volume section can offset higher expenses in having to achieve a greater delta-t in the cooled air.

Figure 1C:
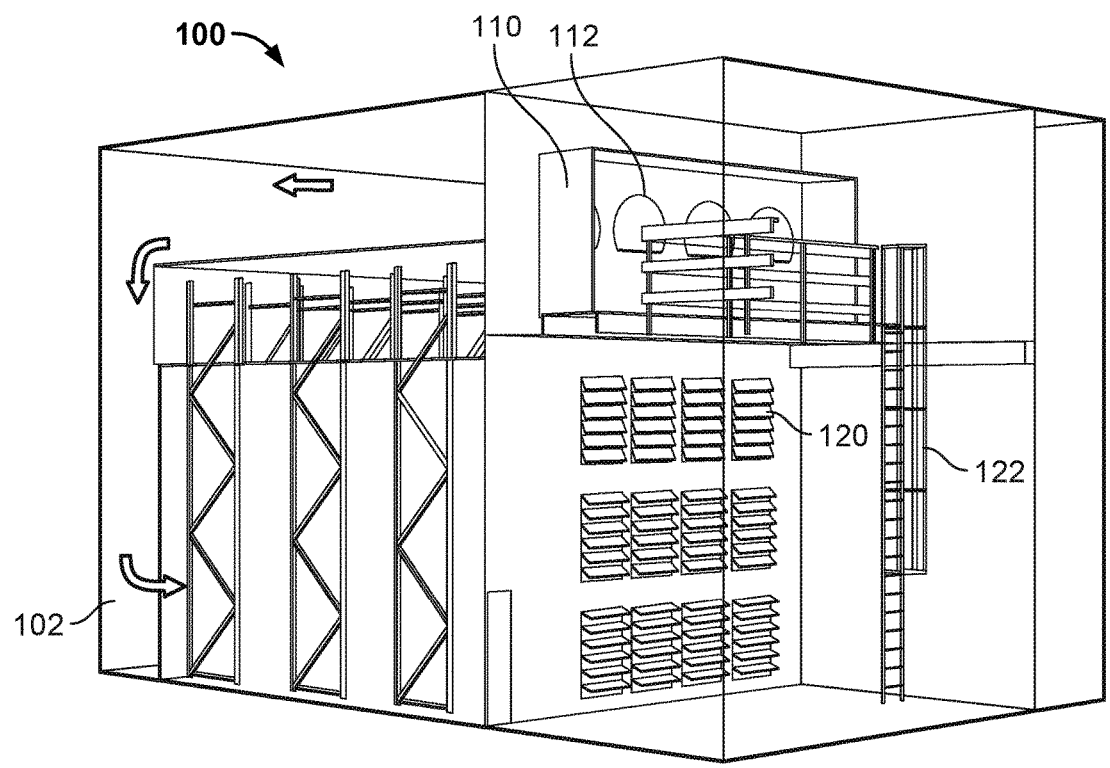
FIG. 1C is an oblique view of the blast cell of FIG. 1A from the rear-and-side.

Referring now to FIG. 1C, which is an oblique view of the blast cell 100 of FIG. 1A from the rear-and-side, additional structures are shown or are shown in more detail. This angle better shows the array of louvers 120 that form a grid of bays and that can be individually controlled so as to control the volume of airflow through each bay. Each louver 120 is provided with a computer-controlled actuator (not shown) that is centrally controllable to fully or partially close or open the respective louver in response to signals from a central computer system that together manages all of the louvers 120 for the particular cell 100, and perhaps manages multiple different cells.

As shown, a fan bank 110 is arrayed horizontally and receives air that comes out of the louvers and enters a back plenum at the back of the cell 100. A catwalk is also provided so that maintenance and operation staff may have access to the fans, their motors, and potentially coils that may be placed proximate to the fans. A ladder or stair 122 provides workers with access to the cat walk.

Using these structures, a forklift or other machinery may access the front face 102 of the cell 100 on a concrete skirt in front of the cell 100, while the machinery is loaded with a pallet or multiple pallets. The machinery may drive up to and potentially into the cell 100 to place its pallets at the rear of the cell 100. The machinery may then exit the cell 100 to obtain additional pallets of items, and multiple different pieces of machinery may operate in parallel at the same time to load the cell 100, though each may be assigned to load a particular column in the cell 100 so as to minimize the chances for interference with each other. The loading may begin at the lowest levels at the rear of the cell 100, proceed to the higher levels at the rear of the cell, and then progressively move toward the front 102 of the cell 100 as the cell 100 fills.

When the cell 100 is filled, the machinery may be removed from the interior of the cell 100, and the cell 100 may be sealed, such as by driving forklifts out of a door and closing and sealing the door. The fan bank 110 may then be started (e.g., including fan 112) and associated cooling coils may be energized (as may fans that circulate air through the coils if the main fan bank does not perform such circulation). Such actions may begin the flow of air through the fan bank 110, through relevant plenums for carrying the air circulation, and through the portions of cell 100 in which the goods to be cooled are held.

When the fans achieve their operating speed, the system may begin monitoring exit temperatures from each bay. In one mode, the system and each bay may be run wide-open (e.g., all louvers may be positioned full-open) until the exit temperature for a particular bay hits a desired cooling point (e.g., 0 degrees F.). The louver for that bay may be caused to close, and the system may continue operating until another bay hits the target temperature and its louver closes so that no or minimal air circulation occurs through that bay subsequently. As the open area of the cell louvers decreases, the air velocity through the others may increase, and in some circumstances, the fan bank 110 may be adjusted lower in speed to keep the airflow through each bay more even across time in the cycle. At some point, the need for airflow may drop low enough that one or more of the fans may be disabled (e.g., by selecting the fan most closely aligned vertically with the majority of the closed bays).

In some examples, the initial (and subsequent) temperature readings for each bay may be used to set a cooling profile (e.g., a degree of closure for the louver on that bay over time during a cooling cycle) for that bay. For example, the bays that have the highest exit air temperatures (as the air passes through the louvers in this example) may have their louvers kept open more than other bays that have lower exit air temperatures, with a goal of having all the bays converge on a desired temperature nearly simultaneously—and where the warmest bay has its louver full-open to minimize the time until full cooling occurs, and all other bays being a percentage of the warmest bay. As discussed more fully below, the profile may be determined as the cycle runs, or may be specified at the beginning of a cycle (e.g., by determining the initial temperature and mass of items in each cell, and optionally consulting information about the ability of such items to give off their heat) and then can be adjusted as the cycle continues, e.g., as actual exit temperatures for a particular bay depart from a predetermined profile of temperatures for the bay.

Figure 1D:
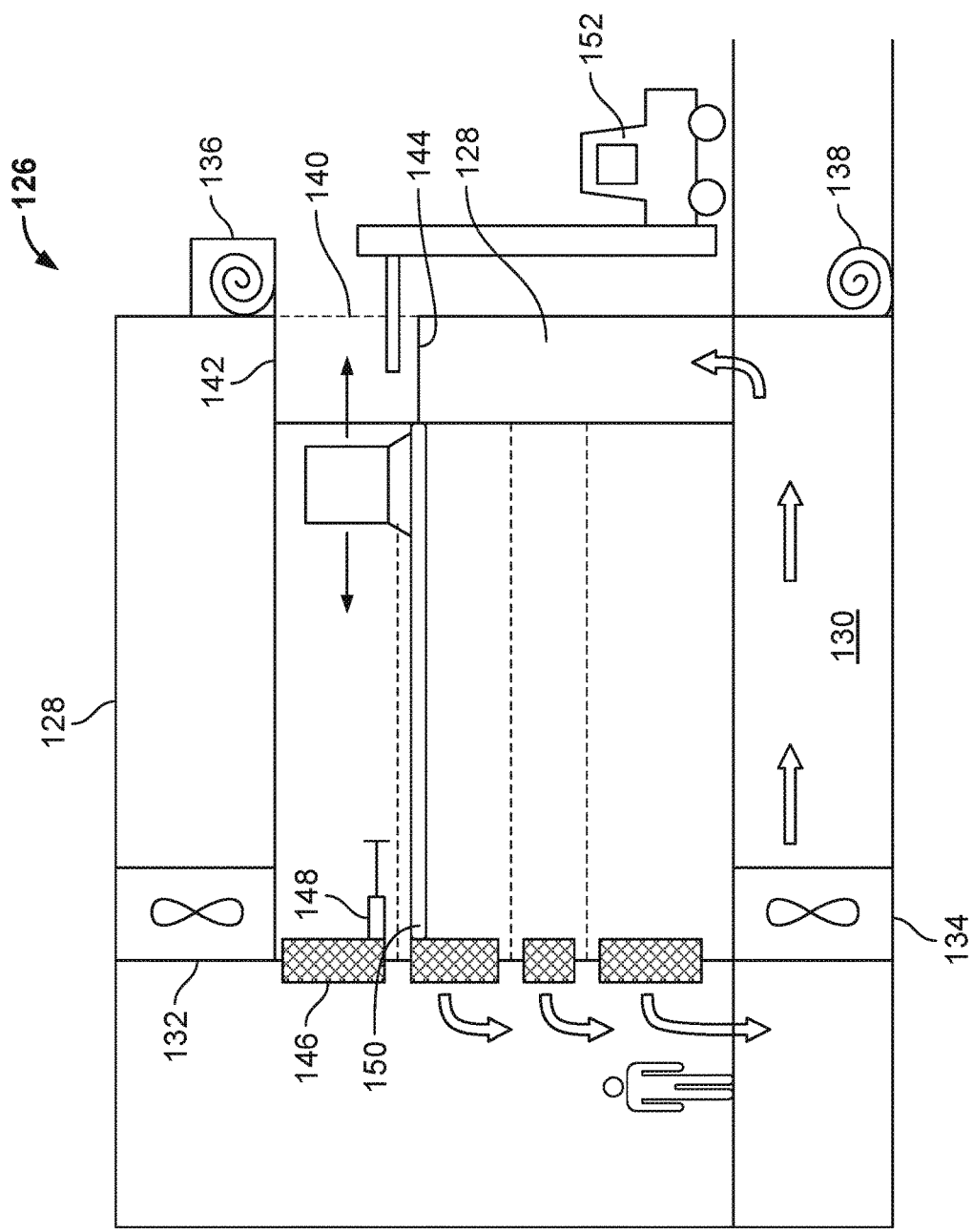
FIG. 1D is a side elevation view of a first per-bay controllable and isolatable blast cell.

FIG. 1D is a side elevation view of a first per-bay controllable and isolatable blast cell. In general, this arrangement for blast cell 126 is similar to that of blast cell 100 in FIGS. 1A-1C, but it has a pair of return air plenums 128, 130, and it has the capability of loading and unloading certain bays (e.g., columns or rows) while the others continue to circulate cooling air (because it can keep some but not all of the bays closed to the outside).

Referring now to particular components in the figure, a blast cell 126 is arranged with an open face and intake plenum 128 to the right, and an output plenum to the left. A plurality of bays within the cell 126 each have a louver 146 at their output end to control the volume of air that will flow through the particular bay. A pair of fan banks 132, 134 are located at the top and bottom of the cell 126 respectively, and allow air to circulate from the exits to the entries of the bays. The split nature of the air returns here allows all air to flow through a top plenum 128, a bottom plenum 130, or both in varying ratios to each other, so that all, some, or none of the bays can be operating at any particular time (e.g., each plenum can serve a portion of the bays when the intake plenum 128 is split into two parts, as explained next).

The control of which bays will be operating occurs via the motion of a pair of blanking panels 136, 138 at the face of the bays. These panels 136, 138 may be made up of multi-panel garage doors that may be rolled and unrolled from mechanisms at the top and bottom of the cell 126. A lower panel may be stowed in a crawl space and may be motorized to extend upward through a slot in the floor, but may be driven over by equipment like a forklift 152 when it is fully recessed. An upper panel may be stowed in a more typical motorized garage door mechanism. The panels may be extended and retracted in tandem so as to leave uncovered a particular row or rows of bays so as to make those bays available for access by the forklift 152—i.e., the top of the lower panel may be one bay-height below the bottom of the other panel, and they can be moved up and down in unison so as to maintain a one-bay-high open space between them for loading and unloading of items into the cell 126.

A pair of flanges 142, 144 may be provided on the panels, and may extend horizontally into the cell 126 so as to prevent air that is circulating through bays that are operable in the cell 126 from leaking out of the cell 126. The flanges 142, 144 are needed in this example because the panels need to be offset from the faces of the bays so that air can move up and/or down through a plenum 128 in front of the bays, so that the flanges 142, 144 help to seal that plenum 128 closed above and below the one open level. As discussed here, the various seals in the cell 126 do not have to be absolute, and their level of sealing will depend on the particular situation. For example, the sealing of fixed panels around the cell 126 can be essentially absolute. The sealing between particular portions of the blanking panels 136, 138 will be less absolute, though there can be tongue-and-groove overlaps between those portions that will provide good seals. The seals around the sides of the blanking panels 136, 138 will be even less complete because of the needed movement, though weather-stripping can provide good seals around the edges when the panels' flanges are even with the top and bottom of a level in the cell 126. And the seals where the flanges 142, 144 meet the faces of the bays will be even less complete because they will require alignment and will brush past each other regularly. The general goal of the sealing, though, is to minimize to the extent practicable the amount of cold air that will leak from the relatively higher pressure inside the cell 126 to surrounding areas, so as to lessen the utility costs of operating the cell 126.

In this example, the ability of the forklift 152 to enter deep into the blast cell 126 is limited because the panels 136, 138 are in the way unless the lower panel 138 is fully retracted into its slot (e.g., the forklift 152 is loading or unloading the lowest row of bays). As a result, various mechanisms may be provided to allow deeper loading of the cell 126 even when deep access by the forklift 152 is unavailable. As one example, the forklift 152 may be provided with extending forks that allow it to push product further away from it (though such extension will be limited by the weight of the product and the need to keep the forklift 152 from tipping over forward). In other instances, a conveyor belt 150 can be provided in each bay, and may be activated to move pallets of items deeper into the cell 126 and into position for cooling, or shallower out of the cell 126 for removal by the forklift 152—so that the belt 150 carries the pallets out of reach from and into reach for the forklift.

In another example, hydraulic rams 148 or other pushing mechanisms may be mounted at the back of each bay. While hydraulic ram 148 is shown here as being inside the particular bay, the ram 148 itself may be mounted to the left of the face of the bay (and extend out from the left end) so that pallets may be more readily filled right up to the louver 146—and the ram may then extend into the bay to push pallets toward the right so that they can be reached by the forklift 152. Thus, in loading, the forklift can lay the pallets of items at the right end of each bay, and a belt may move them incrementally into the bay, or the forklift 152 may push against the right-most pallet. For unloading, the forklift 152 may first remove the right-most pallet (the one at the face of the cell 126), and the ram 148 may push against the left-most pallet to move it one pallet length, so that the second pallet that has become the new right-most pallet is moved into position to be reached by the forklift 152. These steps may be repeated, respectively, until the bay is fully or sufficiently loaded or unloaded.

As shown in this example, the top fan bank 132 will not be currently operational because it is blocked from feeding any bays by flange 142. In such a circumstance, an interlock may sense when flange 142 is in a full-up position, and may cause fan bank 132 to be shut off. Similarly, when flange 144 is at its bottom, fan bank 134 may be shut off, and fan bank 132 may provide all cooling air circulation. When the open section 140 is between the extremes (and when the opening is closed so that all bays are receiving circulated cold air), each fan bank 132, 134 may carry a portion of the air circulation load that is proportional to the effective number of open bays that it is currently serving. Such adjustments may occur by controlling the speed of particular fans in each bank to rotate at different speeds via variable frequency drives and/or shutting off certain ones of the fans as needed and potentially blanking off the shut off fans via operable louvers at their particular face or output.

In this manner, then, a blast cell 126 can be operated substantially continuously, with bays that are not being loaded or unloaded having air continually circulated through them, and with the ability to switch which bays have air circulating through them and which are open and available for loading and unloading. The bays may be individually controlled for the amount of airflow they will pass via opening and closing louvers that serve each respective bay so as to control the amount of cooling that each bay receives—e.g., by providing the most air flow through bays that have the most amount of needed cooling remaining. In one such implementation, the time to unload and load a currently open set of bays may be used as another input for controlling the operation of other bays—e.g., slowing the cooling of the next group of bays to be unloaded and loaded so that they do not hit a target temperature before the current set of bays is fully handled, and the open slot can shift to the next group of bays.

FIG. 1E is a rear elevation view of a second per-bay controllable and isolatable blast cell 160. This cell 160 is similar to the cell 126 of FIG. 1D, but has a vertically-arranged fan bank 162 running down one side of the cell 160 rather than a pair of banks that are respectively above and below the main part of the cell.

In this example, the cell 160 is viewed from its upstream face. A horizontal row of bays 174 is open for loading and unloading, and a left-most bay is currently being loaded in that row, while the rightmost two bays of the row have already been loaded. The open area for loading and unloading is isolated from the other bays through which air is currently circulating by flanges 176, 178 below and above the open row, respectively, and by panel 172, which seals off the right side of the open area so that circulating air does not leak out of the cell 160 to any substantial amount.

As with the cell 126, cell 160 is blocked at its face by an upper panel 166 and a lower panel 168, which may be in the form of conventional multi-panel garage doors, and may be extended from and retracted into, upper and lower rolls, respectively. Thus, once the currently open row is filled, the panel 166 can be extended, and the panel 168 can be retracted so that they then lay above and below, respectively, the second level of bays rather than the third level—and that second level, if it has reached it target cooling level, can be unloaded and then loaded while the other rows undergo cooling.

As a result of such present blockage, air from fan bank 262, including from representative fan 164, can flow across the faces of the first, second, and fourth levels of bays (as shown by the left-pointing flow arrows), and may then flow down through each particular bay (away from the viewer of FIG. 1E). Cooling coils (not shown) may also be placed across the circulation of air, such as at the inlet or outlet of the fans in fan bank 162, at the inlets or outlets of the louvers that are at the downstream end of the bays, or in a parallel circulation to the side of the main circulation (e.g., with the cooling outside the cell 160 on the roof of a building in which cell 160 is located, and where the outlet temperature of the side loop is especially low since its output air will mix in with warmer air from the main circulation).

Other implementations that permit continuous operation of a blast cell are also contemplated. For example, the open area for loading and unloading may be a column rather than a row. In such an example, the moving garage doors or similar structures may be mounted on their sides and slide horizontally in coordination in a track in the floor of the blast cell and near the ceiling of the cell. The flanges in such a situation would then be vertical panels that are the height of the cell. The fan bank may then be on the sides of the cell or at the top of the cell, and may deliver air circulation to bays that are not currently open to loading and unloading. In effect, such an implementation would look like the cell 160 of FIG. 1E rotated counter-clockwise 90 degrees while the forklift 176 stays in its pictured position. Such an implementation could permit a forklift to move deep into the cell because the open area could extend from the floor of the cell to the ceiling for the particular currently-open column of the cell.

Figure 2:
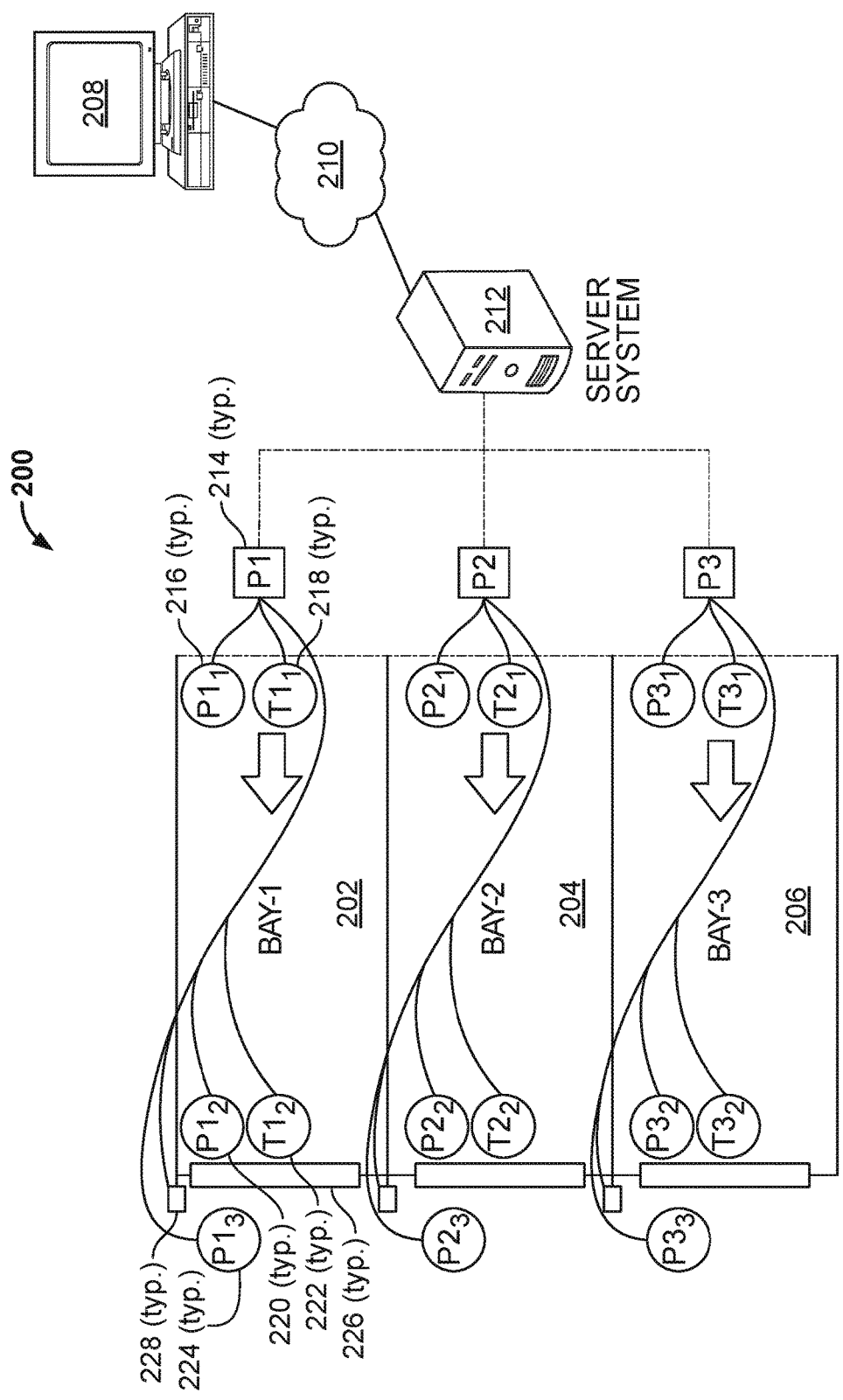
FIG. 2 is a schematic diagram of a control system for a per-bay controllable blast cell system.

FIG. 2 is a schematic diagram of a control system 200 for a per-bay controllable blast cell system. In general, the system here may be used with systems like those described in FIGS. 1A-1E to control air flow through each of multiple different bays, such as by throttling louvers for each bay or fans tied to each bay up and down to increase or decrease the flow of cooled air through the particular bay, to meet cooling demands of items such as food in each such bay.

The system includes a number of sensors that are typical for a first bay 202 and repeated across other bays 204, 206. Although only a single row of three bays is shown here, there may be two dimensions of bays in an m×n grid, and each may have a like complement of sensors and controllers (including sensors that span across a third dimension, such as a temperature sensor at the front, middle, and back of each bay). Each bay has a microcontroller 214 that may provide certain limited control operations for the components in the bay, such as by adjusting an angle of a louver 226 actuator 228 in response to certain values that are sensed for the bay, as programmed externally to the controller 214. Such programming may be obtained from a server system 212, which may be programmed with code for adjusting each of the bays according to factors such as the type of goods in the bay, their starting temperatures, and the amount of pressure drop initially measured for the particular loaded bay, e.g., when the louver for the bay is initially full-open (as described in more detail below).

The various components of the system 200 may communicate over a variety of different networks. For example, the components in the bays may communicate over a local area network (LAN) such as an Ethernet or other appropriate data network. The controller 214 may communicate with the server system 212 over the same LAN or a separate LAN and also over a WAN, which may be a private WAN or a public WAN such as the internet 210. The server system 212 may in turn communicate over a LAN or the internet 210 with an operator terminal 208. The terminal 208 may take the form of a desktop, laptop, or tablet computer, or a smartphone, and may be used by personnel such as a plant manager to monitor remotely the operation of one or more blast cells and to change parameters for them. Multiple such terminals may be employed in series or at the same time by multiple different personnel, and each may have privileges that are particular to their roles. For example, certainly personnel may have the ability to monitor the operation of the system 200, while others may also have the ability to alter the operation of the system 200, such as by selecting particular control algorithms to employ in particular situations, and to change the manner in which the system 200 reacts to particular pressure, temperature, and other parameter values. The capabilities for each user may be enforced by requiring users to log in using unique credentials, and then comparing a role of the user in the organization with a set of qualifications for the user in the system. As just one example, an engineer who notices that items from a particular manufacturer have been taking longer than expected to freeze fully may alter one or more parameters in the system so that such particular type of items from the manufacturer are provided with a comparatively greater amount of cooling air in the future.

Returning now to the cell and bay 202, there is shown a series of sensors along with controls that may be adjusted in response to measurements obtained from the sensors and to other factors that may be provided by the server system 212. At the entrance to the bay 202 are placed a pressure sensor 216 and a temperature sensor 218. The sensors may be located at a location that is representative of the air circulating through the bay 202 but also sufficiently out of the way to avoid damage. In certain implementations, to provide such a goal, multiple sensors may be used and their readings may be combined (e.g., averaged) to provide a reading for the face of the bay 202. For example, whereas the temperature of air entering the bay 202 may be assumed to be consistent because it has been greatly blended after passing through fans and cooling coils, so that one temperature sensors is needed, the same might not be said of the air pressure, particularly if the air is being forced to turn a corner at the face of the bay 202, so that a pressure sensor may be mounted in each of the four corners of the bay 202 and the readings may be averaged in order to provide a more accurate pressure reading. In certain circumstances, the sensors may be interlocked with other mechanisms that open and close the bay 202 for loading and unloading, such that the sensors pull automatically out of the way (and become located close to or behind framing members for the cell) when the bay 202 is open for loading and unloading, and then they snap back out into the airflow after the bay 202 is closed again.

Other sensors may be placed near the exit of bay 202. For example, temperature sensor 222 may be placed just upstream or just downstream of louver 226, as may one or more pressure sensors 220. Pressure sensor 220 may be mechanically or electrically connected to pressure sensor 216, so that a differential pressure reading may be obtained across the depth of the bay 202. In other situations, a pressure sensor such as a pitot tube may be used to identify directly a velocity of air passing past the sensor. In certain situations, a pressure sensor 224 may be placed downstream of louver 226 when another pressure sensor 220 is placed just upstream, so that the current pressure drop across the louver 226 may be determined (e.g., to determine whether louver 226 needs to be throttled open or closed some).

The sensor values in this example are provided to controller 214 that may use them along with other factors (as input to a formula provided to it by server system 212 for a particular cooling batch by the cell) to adjust the operation of various mechanisms for cooling items in the bays 202-206. As one example, louver actuator 228 may be automatically adjusted over time to open or close the louver 226 to varying degrees as needed for desired cooling of the items in the various bays with respect to each other (e.g., so that the exit temperatures of all of the bays reached a desired frozen temperature as simultaneously as practical). In addition, the system 200 may control a plurality of fans, and pumps and chillers for circulating cooling fluid through a plurality of cooling coils.

In one example of operation of the system 200, the bays 202-206 may be loaded with various forms of goods. Each louver 226 may initially be held full-open, and fans may be started to begin air circulating through the bays. After time has passed for the temperature sensors to acclimate (perhaps with the cooling already operating), the input and output temperatures of each bay may be determined, along with the pressure drop through each bay from the goods that are in the bay (where a bay that is more full, or has pallets that change greatly in profile and thus create more turbulence, will have a higher intrinsic pressure drop). Code executed by the server system 212 may then use such values along with other parameters to determine a level of cooling that each bay will need, to determine the amount of time to cool the bay with the highest need, and to identify a profile for throttling each of the other bays so that they receive less cooling, and more is available to the bay with the highest need. The system 200 may then operate according to that plan, with the controllers 214 imposing control for the plan and monitoring for whether the actual results are in line with the plan (e.g., whether the exit temperature readings for each bay are trending properly toward the final temperature). Particular example methods are discussed next.

Figure 3A:
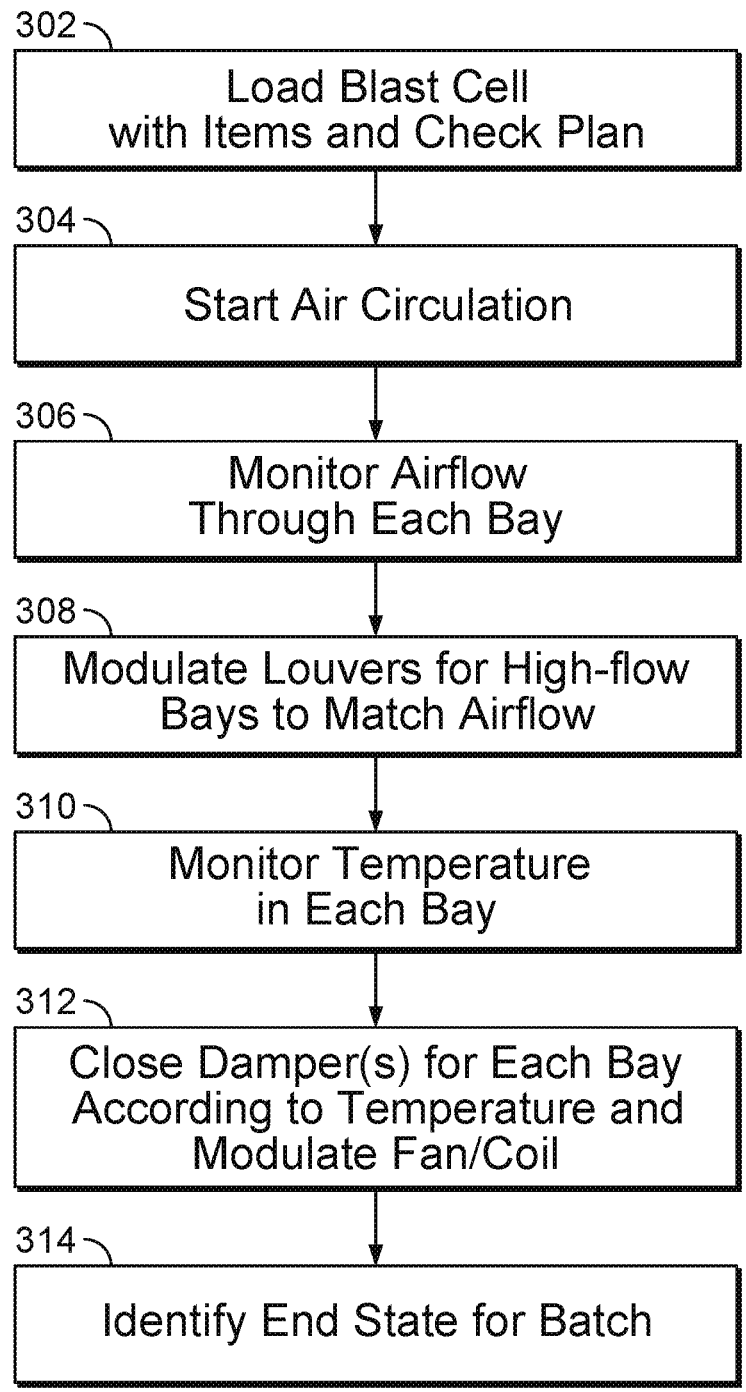
FIG. 3A is a flow diagram of a process for controlling air flow through particular sub-portions of a blast cell.

FIG. 3A is a flow diagram of a process for controlling air flow through particular sub-portions of a blast cell. In general, the process involves controlling air flow on a per-bay basis so as to provide more air flow to bays that need more cooling and less air flow to bays that need less cooling—e.g., so that all bays hit a target temperature at about the same time, and thus achieve a fastest possible cooling for a lowest possible cooling cost. The process here may, in appropriate circumstances, be used with the systems of FIGS. 1A-1E above and the control system of FIG. 2.

The process begins at box 302, where a blast cell is loaded with pallets of items. Such loading may occur by pallets of goods, such as meats or vegetables that are to be frozen for storage and shipping, being brought into place and dropped by forklifts or other mechanisms. The loading may occur as a complete batch, whereby the entire cell is turned off and then opened for loading and unloading. Or it may be on a partial-batch basis, whereby a part of the cell, such as a row of bays or a column of bays, is opened for loading and unloading, while the other rows or columns continued to operate.

This step also involves the system checking a cooling plan. Such a step may occur by a server system accessing data about the goods that are to be cooled, and goal with the cooling such as a target temperature, and other factors, including outside temperatures that may affect the efficiency of the cooling system and the starting temperatures of the goods, time of day which may affect the prices of energy (e.g., where electricity may be particularly expensive during peak use periods, so that a plan may be selected to perform slower cooling during peak periods and faster cooling during off-peak periods), and status of other jobs (e.g., so that a cooling cycle may be performed relatively slowly if there are no or few follow-up jobs in the queue).

At box 304, air circulation starts in the cell. Such a step may occur upon determining that the cell is loaded and closed, e.g., by a technician making a selection on a computer or by a door sensor indicating that a door to the cell has been closed. Such an action may cause the server system to send signals to variable-frequency controllers to start a fan bank of fans and to start pumps to circulate cooling fluid through cooling coils that serve the air that the fans circulate.

At box 306, airflow is monitored in each of the bays, both in terms of air temperature and air volume (e.g., via pressure sensors). One variable that may be monitored throughout the process is exit air temperature for each bay, as an indicator of the temperature of the goods in the bay (though the exit temperature will be slightly lower than the temperature of the goods as the temperature of the goods falls). The exit temperature that is highest may be an indicator of a bay that will take longer to cool than any other bay, though the vector of the temperature may also be indicative (e.g., a high exit temperature that is coming down quickly, or a high exit temperature with a high difference between entrance and exit temperature, may indicate a bay whose goods are throwing off their heat efficiently, and thus may readily "catch up" to other bays that are currently at lower temperatures but are cooling more slowly). In any event, the various sensed temperatures may be used to select a going-forward air flow rate for the particular bay, and the louver(s) for that may be adjusted to be more open or more closed so as to obtain that air flow rate. As one example, the desired airflow rate may be determined repeatedly at one frequency (e.g., every minute) while the louvers or other air control mechanisms may be adjusted at another frequency (e.g., once per second). Also, in some embodiments, the computation of desired airflow may occur at a central server that controls multiple bays, whereas the computations needed to maintain a computed air flow rate may occur at controllers that serve each bay. Also, in certain implementations, each bay may have a fan, such as a propeller fan placed at the respective bay's exit, and the fan speed (either alone or in combination with an automatically-controlled louver) may be used to control air flow rate through the corresponding bay.

Various computational techniques may be employed to identify a desired air flow rate and/or corresponding pressure drop across each particular bay. For example, a simple computation may use exit temperature (both when circulation is first started during a cooling cycle, and as the cycle continuous, in a looping check on the current status of each bay) as an indication of the amount of heat in a bay, and therefore of an amount of heat needed to be taken out of the bay, and by extension, a volume of air that needs to be circulated through the bay—where the amount of heat withdrawn can be expected to fall in a decreasing exponential manner according to one or more appropriate heat transfer equations. The calculation may also take into account more directly the ability of the goods in the bay to release their heat and to cool uniformly, so that the flow allowed through each bay better matches the heat removal needs for each cell. As one example, the system may determine changes in temperature as air passes through a bay at one point in time, and at a point in time several minutes later (e.g., 4-15 minutes later), and later may make a determination from the amount of heat given off by the goods at each point in time, and by the difference in the amount of heat given off between those two points in time, a heat removal characteristic of the goods. In other examples, the heat removal characteristics may be inferred rather than measured. For example, bills of lading or other documents may describe the goods that are on particular pallets, and a program run by a server system may identify heat removal characteristics of such goods (e.g., may determine that the goods are chicken, beef, strawberries, etc. from UPC or other information). In other examples, the provider of goods and the type of goods may be identified, and data about prior cooling runs for that provider and those types of goods may be consulted to generate parameters for the current cooling session for such goods from the provider—under an assumption that the provider will package the goods consistently, so that information gained from the prior sessions may be used to better tune the current session.

At box 308, louvers for high-flow bays are modulated to match the airflow through those bays to the amount of airflow determined by the process to be required. The required airflow may be an airflow needed to reach a target temperature around a target time, or to otherwise match the cooling across the bays that are desired to be loaded and unloaded together. In some implementations, a bay that is determined to be last-to-finish may be throttled down at the beginning of a cycle, under the assumption that greater air flow will be readily available for it later in the cycle, when the quicker-to-cool bays have had their louvers fully closed.

Regardless of the overall plan, a profile for modulating the louver or otherwise controlling the amount of airflow in each particular bay over time, may be formed. The process may then essentially continuously monitor its airflow, compare that against the plan or profile, and close or open the louver or louvers so that the actual current flow matches the computed desired flow for the current point in time.

At box 310, the temperature for each bay may be monitored, such as by monitoring exit temperature for each bay at one or more locations, such as a center-point of the bay just in front of the louver for the bay, or several inches in from each corner of the bay (where air flow is more free), and perhaps also at the center (where airflow is largely blocked and made up largely of eddies). Such monitoring may be made initially to establish parameters for a plan for each bay (e.g., to determine how much heat needs to be removed from each bay). Later monitoring may be performed so as to determine whether the plan is being met, fallen short of, or exceeded. For example, a graph of time versus temperature may be computed initially, and the measured temperatures may be compared to that graph over time. The respective louver or louvers for the particular bay may then be opened more or less to provide more or less volume of cold airflow and thus more or less cooling per unit time going forward.

At box 312, the louvers or dampers for each bay are closed fully when the particular bay achieves its cooling goal, such as when a desired exit temperature is reached, or when a difference between entering temperature of air for the bay and exiting temperature falls below a predetermined value so as to indicate that little heat is being put into the bay by the items on the pallets in the bay. As some bays close down, the velocity through the other bays that have remained open may increase. Such a result may be acceptable, and the plans for those other cells may take into account the increased airflow (and corresponding decrease in the "end" time). If the end time originally computed is acceptable (or the plan took into account that velocity would increase in slow cells as the fast cells reached their temperatures), then the air circulation itself may be limited, such as by slowing the fans or removing certain fans from operation so as to generate a lower total volume of air circulation to match the lower total volume of open bays.

At box 314, the end state of the batch is identified. Such identification may occur by determining that the exit temperature of a last open bay, a temperature distance across the length of that bay, or a temperature sensed by a temperature probe placed in the palleted items has reached a determined value. Where the batch is the entire cell, the fans may then be shut down, as may the pumps for circulating cooling fluid through the cooling coils, and they may stay down while equipment is brought into the cell to unload the pallets and insert new pallets. Where the batch is one column or row in a cell, the open column or row may slide to move over the just-completed set of bays, and they may be unloaded and them loaded, and the open column or row may move on. (In such a situation, if another column or row is not ready to be service, the two roll-up panels may be pushed against each other so that there is no open area, and air may circulate through all of the rows or columns, until one has completed its cycle, and the panels may move to it and then open up over it.)

This process may cycle for each batch that is to be cooled, whether the batch is an entire cell or part of a cell. The parameters for each batch may vary (e.g., to match the entering temperature of items or heat release characteristics of the items) and the strategy may also vary based on factors discussed above and below (e.g., using a "cool quickly" strategy during off-peak hours or when there is a back-log of goods to be cooled, and a "cool economically" strategy during peak hours or during hours of thin demand).

Figure 3B:
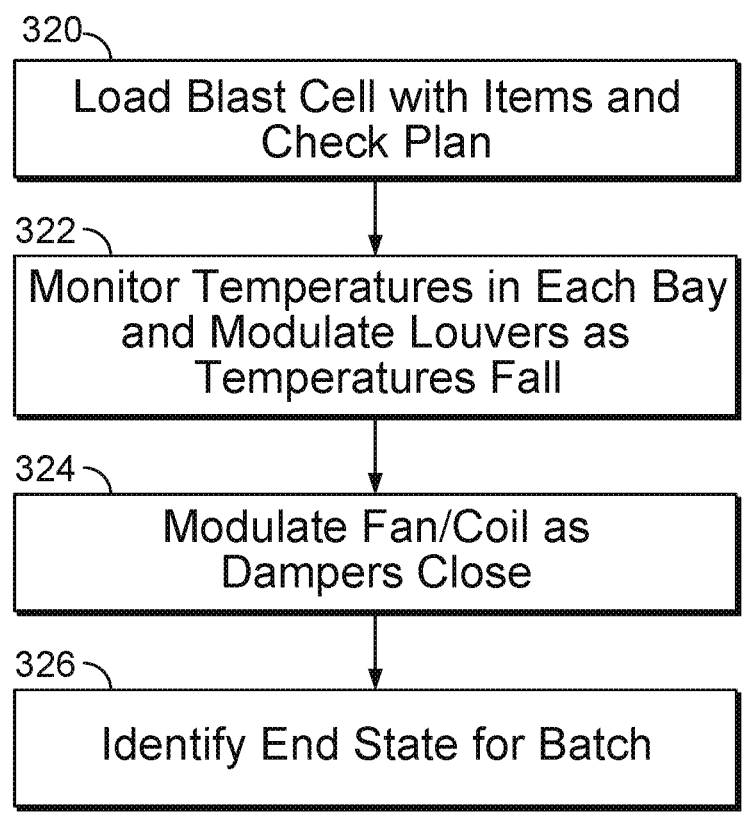
FIG. 3B is a flow diagram of another process for controlling airflow through particular sub-portions of a blast cell.

FIG. 3B is a flow diagram of another process for controlling airflow through particular sub-portions of a blast cell. The process here uses a minimum-time control strategy so as to cool each bay as quickly as possible. In general, the process involves monitoring air temperature on a per-bay basis, and closing the louvers or other flow control mechanisms for a particular bay when that bay hits a target temperature. The process here may, in appropriate circumstances, be used with the systems of FIGS. 1A-1E above and the control system of FIG. 2.

The process begins at box 320, where a blast cell is loaded with items and a plan for cooling the items is checked. As with the process described in FIG. 3A, the loading may occur by forklift or other mechanical means, and may occur for the entire cell at one or a sub-set of the cell such as an open column or row of bays in the cell. Checking of the plan may occur by consulting a server system running software that takes into account a number of factors for selecting a plan for cooling the items, such as the outdoor temperature, the time of day, the backlog of scheduled cooling projects, the current and near-future energy costs (e.g., peak vs. off-peak hours), heat release characteristics of the particular items in particular bays in the cell, and other relevant input factors. The plan output may include parameters to be loaded to one or more microcontrollers to maintain particular air flow rates over particular times during a cooling cycle, and potentially to vary those rates in response to sensed temperatures in the particular bays. For example, a temperature profile for each cell may be computed (e.g., a desired exit temperature as a function of time), and louvers in each respective cell may be modulated open or closed to increase or decrease cooling air flow through the particular bay so as to maintain the desired profile.

At box 322, temperatures are monitored in each bay and louvers that may be located at the bay exits (or alternatively, fans that are mounted to the entry or exit of each bay, respectively) may be modulated so as to increase or decrease flow volumes (or maintain flow volumes) so that the exit temperature for each bay matches the planned temperature profile.

Adjustments to the profile may be made over time also, and the adjusted profiles may then be controlled to. For example, if the backlog of cooling projects drops, the profile may be stretched out to save energy. Likewise, if a sudden on-peak electrical cost transition occurs, a cycle may be stretched out to save energy during the on-peak hours. Also, if a bay is full-open but not maintaining its temperature profile, a server system may determine whether other bays are progressing adequately that they can be throttled down so as to provide additional circulation for the "trailing" bay and/or to determine whether the trailing bay will receive enough circulation after other bays complete their cooling and close down, such that the trailing bay may catch back up to its profile later.

At box 324, the fans and coils, and also the louvers/dampers are modulated in the system so as to maintain the current temperature profile or other independent control variable that is the target of the controlled system. As noted before, the louvers for each individual bay (where each discrete unit of louver control may be for a particular bay or for a group of bays that is less than the entire cell) may be controlled to maintain, for example, a flow rate that is computed to cause the bay to match a falling temperature profile (or to exceed or trail that profile if the system determines that the process is currently behind or ahead, respectively, of the profile). Where the fans are operated in parallel with each other and/or the cooling coils are operated in parallel with each other, they may be controlled as a group to meet what is determined to be a need of the overall cell, such as by summing the needs of each particular bay. In some examples, the fans and coils may be controlled to provide a volume of air and a temperature drop to the air so as to meet the needs of the most-trailing bay—e.g., a bay that is wide-open and still falling behind its computed profile for operating the cycle. Other control mechanisms may also be employed as appropriate.

At box 326, the process identifies an end state for the batch in the cell. Such a determination may be made by identifying that all of the bays have reported in exit temperature values or temperature drops that match or are lower than that required to trigger a closing of their relevant louver(s). Such an event may cause a server system controlling the process to shut down the fans and the pumps for the cooling coils (or to close valves to the coils, particularly when more than one cell is served by a particular chiller or other cooling system).

Figure 3C:
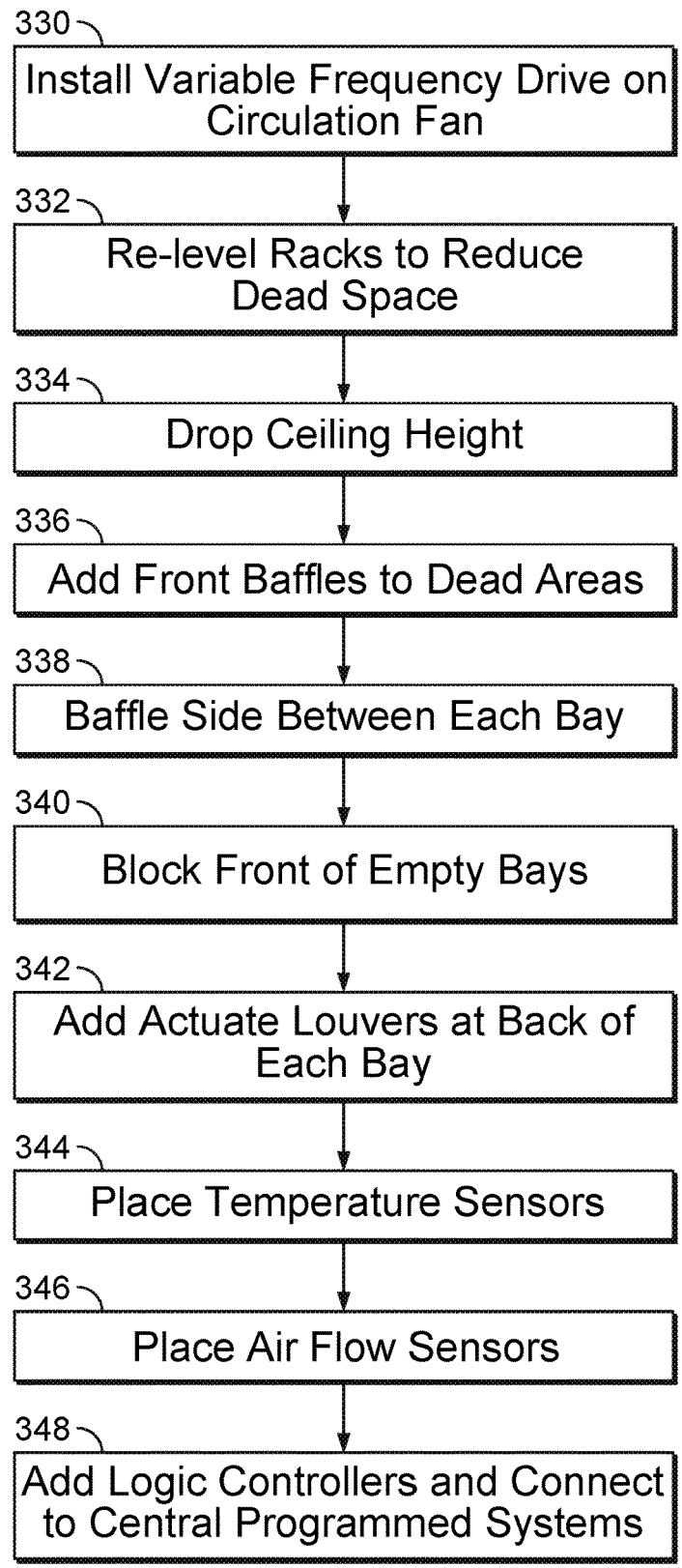
FIG. 3C is a flow diagram of a process for converting a blast cell that does not have per-bay control into one that does.

FIG. 3C is a flow diagram of a process for converting a blast cell that does not have per-bay control into one that does. In general, the process here describes steps that may be taken in a facility that is currently performing general batch cooling, where air flows equally through all bays, to a facility that provides separate control of airflow in sub-portions of the cell, such as at individual bays or groups of bays that are fewer than all the bays in the cell.

The process begins at box 330, where a variable frequency drive (VFD) is installed to control the one or more air circulation fans for the cell. The variable frequency drive may in turn be connected to a control system and may be capable of being controlled to slow down when less air flow is required for a particular bay, group of bays, or entire cell served by the fan. The variability may be expected if the cell is also subdivided so that flow through certain mays can be substantially reduced or closed off entirely. In implementations where the particular fan serves only a particular controlled bay or group of bays, then the fan can be controlled directly to a speed that results in a desired air volume flowing through the bay(s). Typically, in a large cell, multiple VFDs will be installed to controlled multiple fans or groups of fans (one or more fans to each VFD).

At box 332, racks within a cell are re-leveled to reduce dead space. Such a step may involve determining a maximum typical loaded pallet height (e.g., a height that 95% or 98% or 99% of all pallets fall under). The determination may be performed by consulting electronic records of past handled pallets, by measuring pallets currently in a cold storage facility, or by individually measured loaded pallet heights over a period of time as the pallets enter or exit the blast cell facility. The process may then involve repositioning horizontal cross-members in the cell to be spaced apart by that amount. Such a step will reduce the amount of open space above pallets in typical loads of the cell, thereby forcing a larger percentage of circulating air to pass in close contact with goods on the pallets, and potentially created room for additional bays in the cell.

At box 334, the ceiling height is lowered. To the extent the re-leveling of the multiple levels of racks made room for a new level, the new ceiling may be at that height (and may be close enough to the existing ceiling height so that no adjustment is needed). Otherwise the ceiling may be lowered by an amount that corresponds to the amount of height saved by the re-leveling of the prior rows or levels of racks. In implementation, the original ceiling may be cut free, lowered to the new height, and resecured. Or, a new false ceiling below the original ceiling can be installed, e.g., by building a box beam or angle iron frame (e.g., in a grid) and securing sheet metal or other sheet to the top and/or bottom of that frame, along with sealing seams between the sheets.

At box 336, front baffles, or blank-off panels, may be added in front of any areas that are meant to be dead in the new cell. For example, where a new ceiling has been added below the old ceiling, sheet metal panels may be installed at the entrances to the bays created by such addition. The baffles or panels may prevent air from dead ending in such spaces, and then cause turbulence and unnecessary pressure drop in the system.

At box 338, the side between each bay, or column of bays, is baffled, such as with blank-off panels made of sheet metal. Such an action may involve simply attaching (e.g., by bolt, rivet, weld, or adhesive) sheets to existing super-structure of the cell and/or by adding additional structure to serve as necessary attachment points for the sheet. Again, the seams between panels may be sealed (e.g., via overlap, caulking, or other appropriate mechanism). The degree of sealing between bats may be less than is necessary for outer walls of the cell because there will generally be little pressure difference and little temperature difference between adjacent bays in the cell (at least when all are operating, though pressure differences may be higher after one of the bays has been shut down). Rather, the goal is to permit the system to adequately control and measure air properties such as air flow rate and air temperature, as between adjacent bays.

In certain implementations, more than one bay may be included in a single airflow zone, so that baffles are not installed between those bays. For example, all bays in a vertical column may be in fluid communication with each other and/or all bays across a particular horizontal level may be in communication with each other.

In some implementations, the cell may be constructed to permit communication between adjacent bays, but the items loaded into the bays may block at least some of such communication. For example, a cell may be constructed so as to not have dividers between bays above or below each other. In such an example, pallets may be supported by rails or flanges that run along the outside edges of the particular column. Pallets may then be solid in their top panel or bottom panel, and may include weather stripping or similar material about their peripheral edges. When such pallets are slide into the bay on the rails, then, and pushed tight against each other, they can serve to block a particular bay from a bay above it and/or a bay below it—and to thus provide benefits of being able to control the different levels in that column separately from each other.

At box 340, the fronts of empty bays are blocked. Such a step may occur in a manner like that for adding baffles to dead areas in step 336. However, in some implementations, the current step may be less permanent—i.e., removable blank-off panels may be provided for a cell, and technicians may put them into place or remove them selectively based on a determination of whether the particular bay will be full or empty for a particular cooling batch.

At box 342, actuated louvers are added at the back (or front, in some examples) of each bay in the cell. In one example, each bay may have a single louver mounted to its exit or entrance (where the bay can then be loaded/unloaded from its entrance or exit, respectively—though it would be possible to load/unload from the end where the louvers are mounted if the louvers may be moved out of the way). Each such louver may then be associated in a control system with sensors that are also placed in the same particular bay. In some examples, propeller fans may be located at the locations that louvers would otherwise be located (though that would allow some air to pass), or both may be mounted together—e.g., with a propeller fan the size of the bay mounted to the exit of the bay, and a louver mounted to the exit (or entry) of the propeller fan. As an alternative to providing fans on a per-bay basis, a bank of fans may operate together to handle airflow for all the open bays in the cell.

At box 344, temperature sensors are placed in the cell. The number of and locations of the sensors may be determined in a manner that allows a sufficiently accurate determination of the temperature of palleted goods that may be placed in each bay. For example, one or more sensors may be placed at the entrance of each bay, and one or more may be placed at an exit. Alternatively, or in addition, one or more temperature probes may be employed, and they may be inserted into the pallets to monitor actual in-pallet temperatures during a cooling cycle—whether that is simply the temperature inside plastic wrapping for a pallet, or even a probe inserted into the food or other item itself. In some examples, "dummy" items may be placed in a bay and a probe may be placed in them—such as a piece of material designed to mimic the thermal characteristics of chicken, strawberries, or other items t—at might be part of a cooling cycle in the cell.

At box 346, air flow sensors may be placed in the cell, such as in each separate bay. Again, the sensors may be located at one or more locations that are necessary to identify how much flow (approximately) is passing through each bay, including sensors for each bay, and sensors where the air is commingled for recirculation (e.g., at cooling coils in a main plenum for the cell). In some examples, louvers can be acquired that include integrated air flow sensors (and perhaps integrated temperature sensors), and such devices can simply be connected to a control system to provide air flow data to the system.

At box 348, logic controllers may be added to the system, and connected to a central programming system. A goal may be to create a system in which distributed processors gather data from the various sensors and handle discrete control decisions such as controlling louvers to maintain a particular air flow rate in a particular bay. Those distribute processors may in turn be connected to a central control system, such as by which a technician or engineer may interact to provide rules for selecting control parameters for particular situations, and the system may provide information to the distributed controllers for each cycle so as to indicate what parameters those distributed controllers are to maintain, such as particular air flow rates or temperature levels, over time. The degree of addition or integration required in the control system will depend, in an upgrade situation, on the capabilities of the existing control system, the complexity of future control that is desired, and the types of components, such as VFDs and the like, that are added as part of the upgrade.

Figure 4:
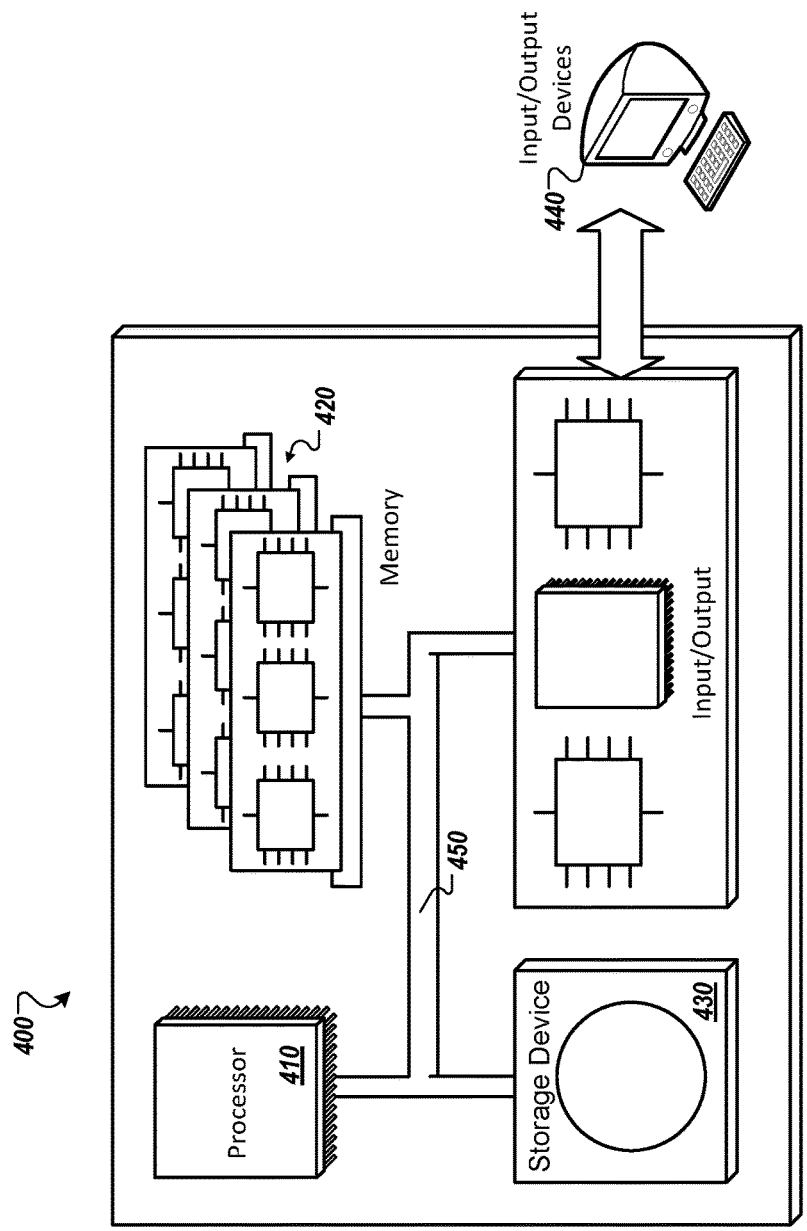
FIG. 4 is a block diagram of example computing devices for controlling systems like those discussed above.

FIG. 4 is a block diagram of example computing devices 400, that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 410, memory 420, a storage device 430, a high-speed controller connecting to memory 420 and high-speed expansion ports 410, and a low-speed controller connecting to low-speed bus 414 and storage device 430. Each of the components 410, 420, 430, 410, and, are interconnected using various busses, and may be mounted on a common motherboard or in other manners as appropriate. The processor 410 can process instructions for execution within the computing device 400, including instructions stored in the memory 420 or on the storage device 430 to display graphical information for a GUI on an external input/output device, such as display 416 coupled to high-speed controller. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information within the computing device 400. In one implementation, the memory 420 is a computer-readable medium. In one implementation, the memory 420 is a volatile memory unit or units. In another implementation, the memory 420 is a non-volatile memory unit or units.

The storage device 430 is capable of providing mass storage for the computing device 400. In one implementation, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high-speed controller manages bandwidth-intensive operations for the computing device 400, while the low-speed controller manages lower bandwidth-intensive operations. Such allocation of duties is an example only. In one implementation, the high-speed controller is coupled to memory 420, display (e.g., through a graphics processor or accelerator), and to high-speed expansion ports 410, which may accept various expansion cards (not shown). In the implementation, low-speed controller is coupled to storage device 430 and low-speed bus. The low-speed bus (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system. In addition, it may be implemented in a personal computer such as a laptop computer. Alternatively, components from computing device 400 may be combined with other components in a mobile device (not shown). Each of such devices may contain one or more of computing devices 400, and an entire system may be made up of multiple computing devices 400 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A blast cell system, comprising: a plurality of bays that are spaced across the blast cell system, arranged to hold items to be cooled, wherein each bay of the plurality of bays has an entrance and an exit, and is separated from each other bay so as to prevent cross-flow of air from one bay to another bay of the plurality of bays;

a plurality of louvers, each covering a different bay of the plurality of bays; one or more entrance sensors positioned at or near the entrance for each of the plurality of bays and one or more exit sensors positioned at or near the exit for each of the plurality of bays, wherein the one or more entrance sensors and the one or more exit sensors each include one or more of: pressure sensors, temperature sensors, or both, positioned to sense differential flow conditions between the entrance and the exit for each of the plurality of bays; and a controller programmed to modulate open-closed positions of each of the plurality of louvers separately from others of the plurality of louvers during the blast cell system's cooling process based on the differential flow conditions sensed by the one or more entrance sensors and the one or more exit sensors, wherein modulating the open-closed positions of each of the plurality of louvers allows for dynamic adjustment of different volumes of cooling air to flow through each respective bay of the plurality of bays during the cooling process.

2. The blast cell system of claim 1, wherein a plurality of fans are in fluid communication with a single plenum that serves all of the plurality of bays.

3. The blast cell system of claim 1, wherein a cross-sectional area of the plurality of bays is divided into an m×n grid, where m is a positive integer greater than one and n is a positive integer greater than one.

4. The blast cell system of claim 3, wherein each bay of plurality of bays includes
   (a) one or more flow sensors to identify a volume of airflow through a respective bay of plurality of bays and
   (b) the one or more temperature sensors to identify a temperature of airflow through the respective bay of the plurality of bays, and the controller is programmed to control respective ones of the plurality of louvers so as to provide comparatively greater airflow, as determined based on the volume of airflow identified by the one or more flow sensors for each bay of the plurality of bays, to one or more bays of the plurality of bays that are indicated as having comparatively higher temperature airflows, identified by the one or more temperature sensors, than other bays of the plurality of bays.

5. The blast cell system of claim 4, wherein the controller is programmed to provide air flow so as to minimize a time between which a first bay of items in the blast cell system have been fully frozen and a last bay of items in the blast cell system have been fully frozen for a given overall level of airflow through the blast cell system.

6. The blast cell system of claim 1, wherein each bay of the plurality of bays is open from the entrance, where fans supply air to each bay of the plurality of bays, to the exit where air is returned to the fans, and wherein the plurality of louvers are located near the exit of each bay of the plurality of bays.

7. The blast cell system of claim 1, wherein each bay of the plurality of bays is separated from each other bay of the plurality of bays by vertical panels.

8. The blast cell system of claim 7, wherein each bay of the plurality of bays is separated from each other bay of the plurality of bays by horizontal panels that extend the substantial length of each bay of the plurality of bays.

9. The blast cell system of claim 1, further comprising a movable air blockade arranged to selectively block blast cell system air flow from a selected plurality of bays while: permitting access to the selected plurality of bays from outside the blast cell system and permitting air flow to the plurality of bays other than the selected plurality of bays.

10. A method of operating a blast cell system, the method comprising: circulating cooling air with one or more cooling fans through a plurality of bays that are each laterally separated from adjacent the plurality of bays so that cross-flow of air between the plurality of bays is prevented, wherein each bay of the plurality of bays has an entrance and an exit; measuring, by one more entrance sensors positioned at or near the entrance for each bay of the plurality of bays and one or more exit sensors positioned at or near the exit for each bay of the plurality of bays, differential temperature, differential air pressure levels, or both in each bay of the plurality of bays, wherein the one more entrance sensors and the one more exit sensors each include one or more of: pressure sensors, temperature sensors, or both, positioned to sense differential flow conditions between the entrance and the exit for each bay of the plurality of bays; determining, from the measured differential air pressure levels, particular levels of the differential air pressure for each bay of the plurality of bays so as to achieve a desired cooling level; and modulating open-closed positions of a plurality of louvers associated with respective ones of the plurality of bays during the blast cell system's cooling process based on the differential flow conditions sensed by the one more entrance sensors and the one more exit sensors, wherein modulating the open-closed positions of each of the plurality of louvers allows for dynamic adjustment of air flow through each bay of the plurality of bays, wherein the plurality of louvers for a first bay of the plurality of bays are controlled separately from the plurality of louvers for others of the plurality of bays during the cooling process.

11. The method of claim 10, wherein a plurality of fans are in fluid communication with a single plenum that serves all of the plurality of bays.

12. The method of claim 10, wherein a cross-sectional area of the plurality of bays is divided into an m×n grid, where m is a positive integer greater than one and n is a positive integer greater than one, and each bay of the plurality of bays in the grid has a louver that is adjusted separately from each other bay of the plurality of bays in the grid.

13. The method of claim 12, wherein each bay of the plurality of bays includes
   (a) one or more flow sensors that identify a volume of airflow through a respective bay of the plurality of bays and
   (b) the one or more temperature sensors that identify a temperature of airflow through the respective bay of the plurality of bays, and the method comprises employing a computer controller to control respective ones of the plurality of louvers so as to provide comparatively greater airflow, as determined based on the volume of airflow identified by the one or more flow sensors for each bay of the plurality of bays, to one or more bays of the plurality of bays that are indicated as having comparatively higher temperature airflows, identified by the one or more temperature sensors, than other sub-areas.

14. The method of claim 13, wherein the computer controller provides air flow so as to minimize a time between which a first bay of items in the blast cell system have been fully frozen and a last bay of items in the blast cell system have been fully frozen for a given overall level of airflow through the blast cell system.

15. The method of claim 10, wherein each bay of the plurality of bays is open from the entrance, where fans supply air to each bay of the plurality of bays, to the exit where air is returned to the fans, and wherein the plurality of louvers are located near the exit of each bay of the plurality of bays.

16. The method of claim 10, further comprising moving an air blockade arranged to selectively block blast cell air flow from a selected plurality of bays so as to: permit access to the selected plurality of bays from outside the blast cell system, and permit air flow to the plurality of bays other than the selected plurality of bays.

17. A method of providing a per-bay controllable blast cell, comprising: providing one or more fans controlled by a variable frequency drive to serve the blast cell; providing full-length baffles between bays in the blast cell that extend from a front end of the blast cell to a back end of the blast cell, to block cross-flow of air between the bays; providing one or more entrance sensors positioned proximal the front end of each of the bays and one or more exit sensors positioned proximal the back end of each of the bays and configured to sense differential pressure conditions between the front end and the back end of each of the bays, wherein the one or more entrance sensors and the one or more exit sensors each include one or more of: pressure sensors, temperature sensors, or both, positioned to sense differential flow conditions between the entrance and the exit for each of the bays; and providing separately-controllable louvers at the front end of each bay of the bays in the blast cell and connecting the louvers to a control system that is arranged to modulate open-closed positions of each of the louvers for a particular bay separately from the louvers for other bays during the blast cell system's cooling process, based on differential flow conditions sensed by the one or more entrance sensors and the one or more exit sensors, taken from respective ones of the bays wherein modulating the open-closed positions of each of the louvers allows for dynamic adjustment of different volumes of cooling air to flow through each respective bay of the bays during the cooling process.

18. The method of claim 17, further comprising: one or more first temperature sensors positioned proximal the front end for each of the bays and one or more second temperature sensors positioned proximal the back end for each of the bays and configured to sense differential temperature conditions between the front end and the back end for each of the bays; wherein the one or more entrance sensors and the one or more exit sensors comprise pressure sensors configured to sense differential pressure conditions between the entrance and the exit for each of the bays, and the controller is programmed to modulate open-closed positions of each of the louvers so as to provide comparatively greater airflows, as determined based on the differential pressure conditions, to the bays that are indicated as having comparatively higher temperatures than other bays of the bays as indicated by the differential temperature conditions.

19. The blast cell system of claim 1, further comprising:
one or more first temperature sensors positioned proximal the entrance for each of the plurality of bays and one or more second temperature sensors positioned proximal the exit for each of the plurality of bays and configured to sense differential temperature conditions between the entrance and the exit for each of the plurality of bays;
wherein the one or more entrance sensors and the one or more exit sensors comprise pressure sensors configured to sense differential pressure conditions between the entrance and the exit for each of the plurality of bays, and the controller is programmed to modulate open-closed positions of each of the plurality of louvers so as to provide comparatively greater airflows, as determined based on the differential pressure conditions, to bays that are indicated as having comparatively higher temperatures than other bays as indicated by the differential temperature conditions.

20. The method of claim 10, wherein the blast cell system further comprises one or more first temperature sensors positioned proximal the entrance for each of the plurality of bays and one or more second temperature sensors positioned proximal the exit for each of the plurality of bays and configured to sense differential temperature conditions between the entrance and the exit for each of the plurality of bays, and the one or more entrance sensors and the one or more exit sensors comprise pressure sensors configured to sense differential pressure conditions between the entrance and the exit for each of the plurality of bays, and controlling the plurality of louvers further comprises modulating open-closed positions of each of the plurality of louvers so as to provide comparatively greater airflows, as determined based on the differential pressure conditions, to bays that are indicated as having comparatively higher temperatures than other bays as indicated by the differential temperature conditions.

* * * * *